(12) United States Patent
Yaginuma et al.

(10) Patent No.: US 11,069,915 B2
(45) Date of Patent: Jul. 20, 2021

(54) SPRING MEMBER, FUEL CELL UNIT, AND FUEL CELL STACK

(71) Applicant: Nissan Motor Co., Ltd., Yokohama (JP)

(72) Inventors: Motoki Yaginuma, Kanagawa (JP); Akira Yasutake, Kanagawa (JP); Norihiro Tajima, Kanagawa (JP); Koichi Kawasaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 41 days.

(21) Appl. No.: 16/642,408

(22) PCT Filed: Aug. 28, 2018

(86) PCT No.: PCT/JP2018/031818
§ 371 (c)(1),
(2) Date: Feb. 27, 2020

(87) PCT Pub. No.: WO2019/058901
PCT Pub. Date: Mar. 28, 2019

(65) Prior Publication Data
US 2020/0235417 A1    Jul. 23, 2020

(30) Foreign Application Priority Data

Sep. 22, 2017   (JP) .............................. JP2017-182979

(51) Int. Cl.
*H01M 8/248*   (2016.01)
*H01M 8/2457*  (2016.01)
*H01M 8/0247*  (2016.01)
*H01M 8/026*   (2016.01)

(52) U.S. Cl.
CPC .......... *H01M 8/248* (2013.01); *H01M 8/026* (2013.01); *H01M 8/0247* (2013.01); *H01M 8/2457* (2016.02)

(58) Field of Classification Search
None
See application file for complete search history.

(56) References Cited

U.S. PATENT DOCUMENTS

2004/0053099 A1* 3/2004 Franklin ............. H01M 8/0247
429/437
2009/0305104 A1* 12/2009 Matsumoto ........... H01M 8/248
429/434

(Continued)

FOREIGN PATENT DOCUMENTS

JP     05-335024 A   * 12/1993
JP     2006-318863 A   11/2006

(Continued)

*Primary Examiner* — Alix E Eggerding
(74) *Attorney, Agent, or Firm* — Global IP Counselors, LLP

(57) ABSTRACT

A spring member is used in a fuel cell stack. The spring member includes a planar portion and a spring portion. The planar portion is joined to a separator in a state of surface contact with the separator. The spring portion extends from the planar portion and generates an elastic force for pressing the separator toward a power generation cell by receiving force in a stacking direction of a cell unit and undergoing bending deformation.

11 Claims, 24 Drawing Sheets

(56) References Cited

U.S. PATENT DOCUMENTS

2015/0372334 A1* 12/2015 Yagi .................... H01M 8/0297
   429/465
2016/0164110 A1* 6/2016 Horai .................. H01M 8/0267
   429/482
2018/0159164 A1* 6/2018 Jilani .................. H01M 8/0258

FOREIGN PATENT DOCUMENTS

| JP | 2012-248460 A | 12/2012 |
| JP | 2013-97982 A | 5/2013 |
| JP | 2013-229289 A | 11/2013 |

* cited by examiner

SPRING MEMBER, FUEL CELL UNIT, AND FUEL CELL STACK

CROSS-REFERENCE TO RELATED APPLICATIONS

This application is a U.S. national stage application of International Application No. PCT/JP2018/031818, filed on Aug. 28, 2018, which claims priority to Japanese Patent Application No. 2017-182979, filed on Sep. 22, 2017. The entire contents disclosed in Japanese Patent Application No. 2017-182979 is hereby fully incorporated herein by reference.

BACKGROUND

Technical Field

The present invention relates to a spring member used in a fuel cell stack, a fuel cell unit, and a fuel cell stack.

Background Information

Conventionally, a fuel cell stack is made by stacking a plurality of fuel cell units, each having a power generation cell that is formed by sandwiching an electrolyte from both sides with a pair of electrodes and that generates power by using supplied gas, and a separator that defines a flow path portion, i.e., a flow passage for the gas between the separator and the power generation cell, and that is in conductive contact with the power generation cell (for example, refer to Japanese Laid-Open Patent Application No. 2013-97982-Patent Document 1).

The fuel cell stack has a spring member that generates elastic force that presses the separator toward the power generation cell.

SUMMARY

In the fuel cell stack described above, the spring member presses the separator toward the power generation cell at the end portion thereof, so that stress tends to concentrate at the end portion. Since the power generation cell emits heat during power generation, the temperature of the spring member becomes high. If the temperature of the spring member becomes high in a state in which stress is concentrated on the spring member, the spring member could be subjected to creep deformation, and the force with which the separator is pressed against the power generation cell could become weak. As a result, there is the problem that surface pressure between the power generation cell and the separator may decrease, thereby increasing the collector resistance, and the power generation performance of the fuel cell may decrease.

An object of the present invention is to provide a spring member, a fuel cell unit, and a fuel cell stack that can prevent the decrease in the power generation performance of the fuel cell caused by the creep deformation of the spring member.

In order to achieve the object described above, a spring member according to the present invention is used in a fuel cell stack, comprising a planar portion that is joined to a separator in a state of surface contact with the separator, and a spring portion that extends from the planar portion and that generates an elastic force for pressing the separator toward the power generation cell by receiving force in the stacking direction of the cell unit and undergoing bending deformation.

DETAILED DESCRIPTION OF THE EMBODIMENTS

Figure 1:
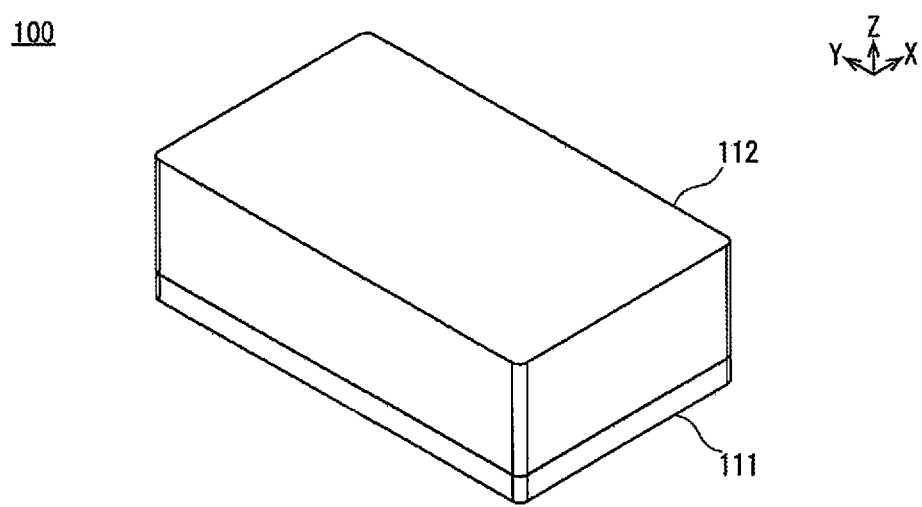
FIG. 1 is a perspective view illustrating a fuel cell stack according to a first embodiment.

Embodiments of the present invention will be explained below with reference to the appended drawings. In the drawings, the same members have been assigned the same reference symbols and redundant explanations have been omitted. In the drawings, the sizes and proportions of the members have been exaggerated for ease of understanding the embodiment and may differ from actual sizes and proportions.

The orientations of members constituting a fuel cell stack are shown using arrows indicated by X, Y, and Z in each of the drawings. The direction of the arrow indicated by X is the transverse direction X of the fuel cell stack. The direction of the arrow indicated by Y is the longitudinal direction Y of the fuel cell stack. The direction of the arrow indicated by Z is the stacking direction Z of the fuel cell stack.

Configuration of Fuel Cell 100

Figure 2:
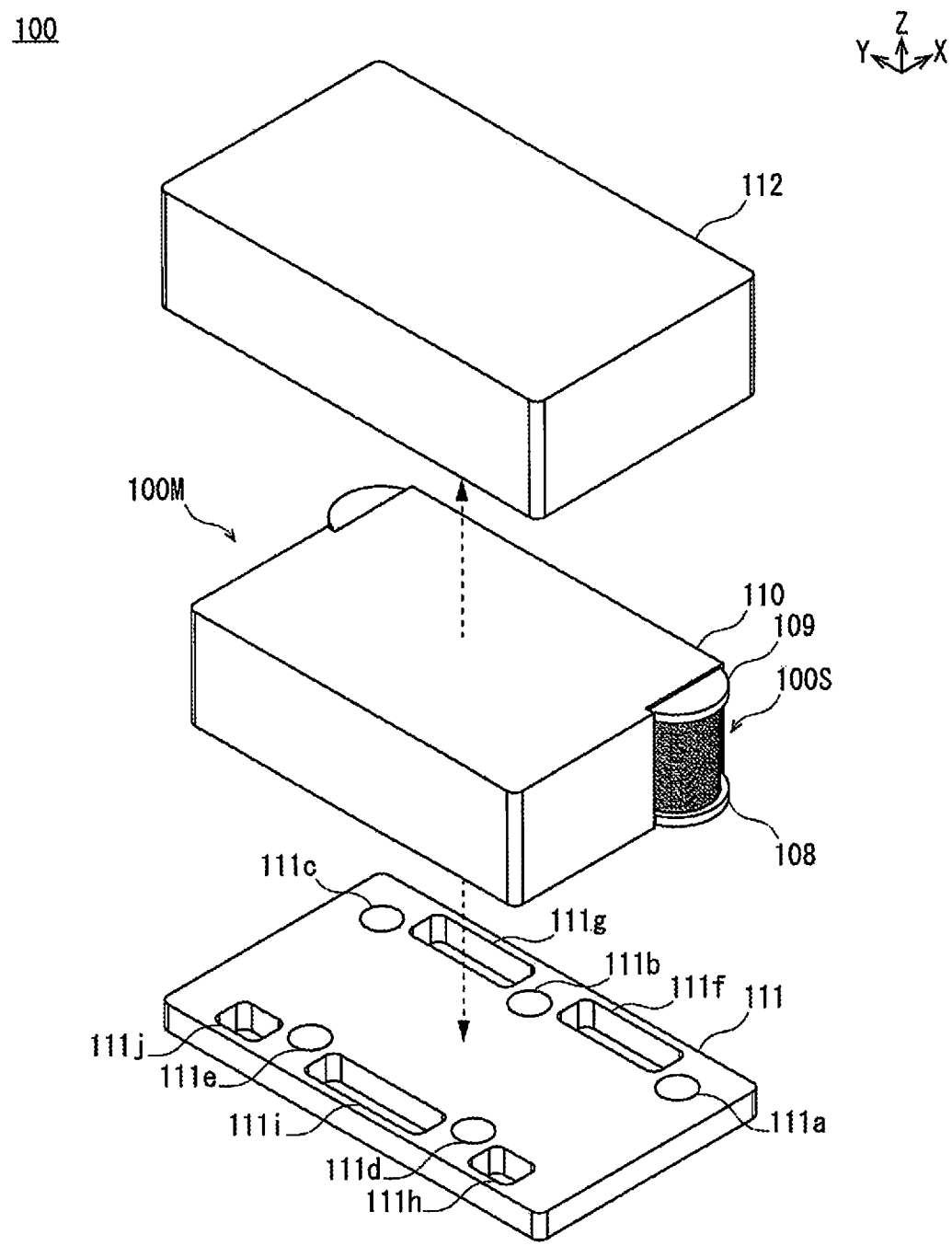
FIG. 2 is a perspective view illustrating a state in which the fuel cell stack of FIG. 1 is disassembled to show a cover, a cell stack assembly, and an external manifold.

As shown in FIGS. 1 and 2, the fuel cell 100 is formed by sandwiching a cell stack assembly 100M from above and below with a cover 112 that protects the cell stack assembly 100M and an external manifold ill that supplies gas from the outside.

Figure 3:
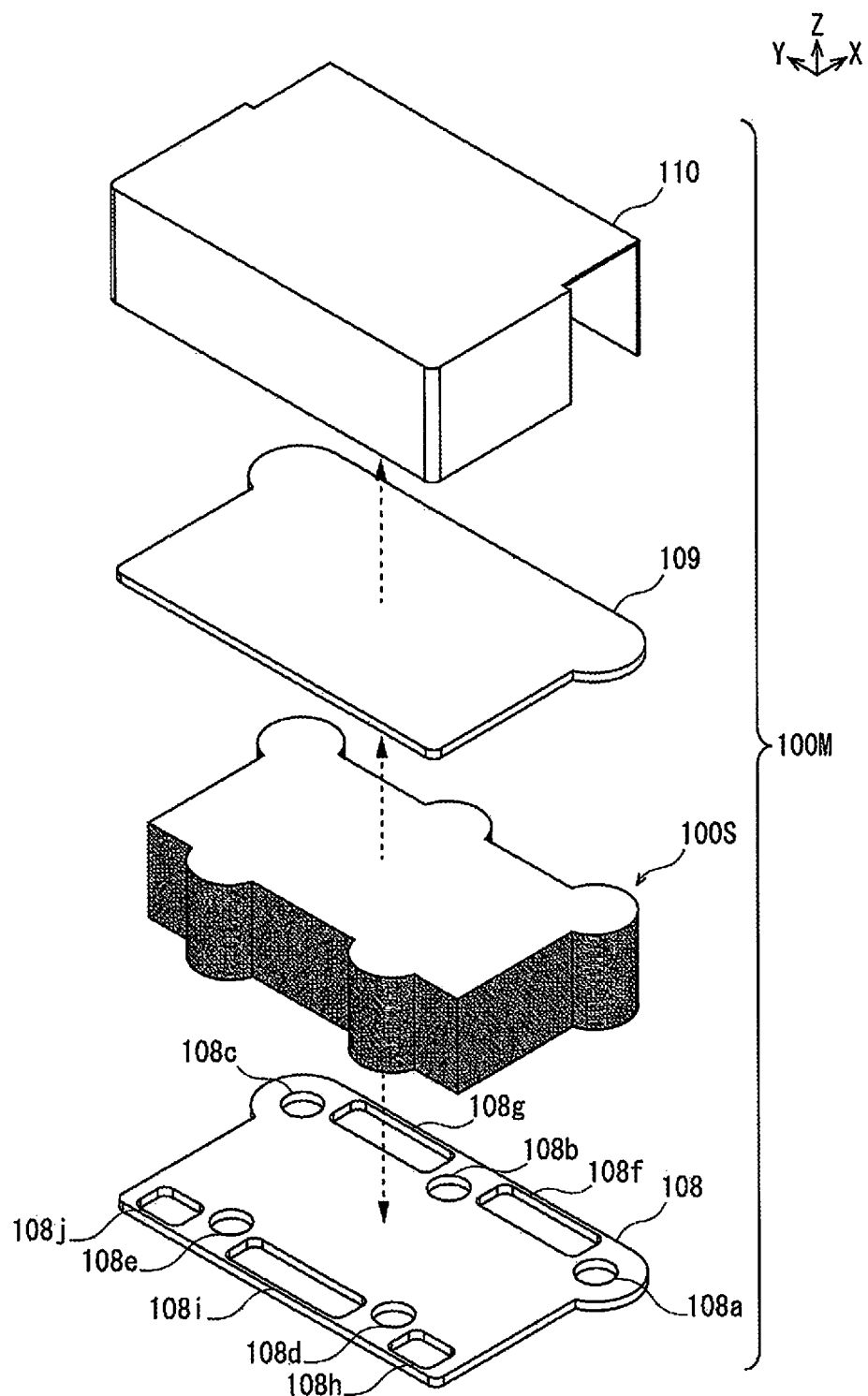
FIG. 3 is a perspective view illustrating a state in which the cell stack assembly of FIG. 2 is disassembled to show an air shelter, an upper end plate, a stack, and a lower end plate.

As shown in FIGS. 2 and 3, the cell stack assembly 100M is formed by sandwiching a fuel cell stack 100S from above and below with an upper end plate 109 and a lower end plate 108, which are then covered with an air shelter 110 that seals cathode gas CG.

Figure 4:
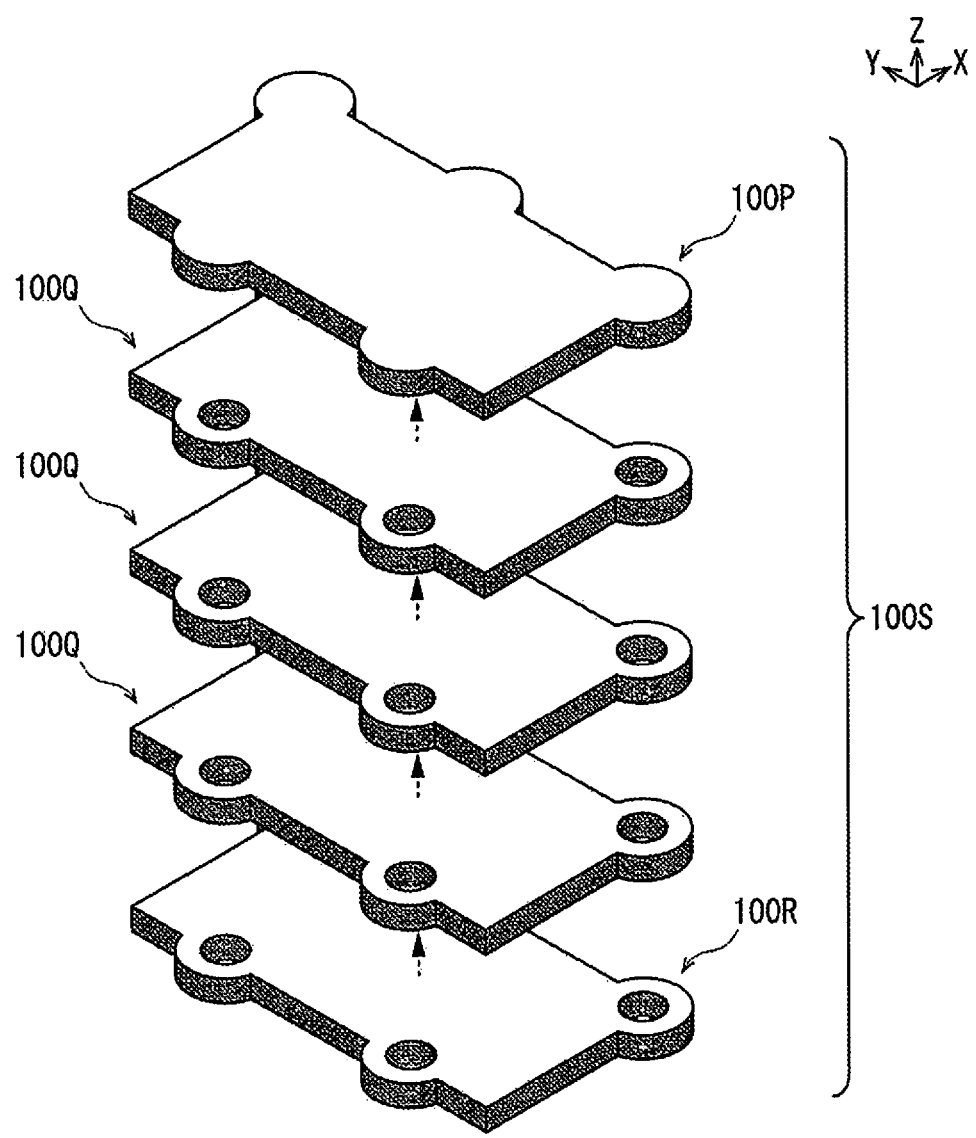
FIG. 4 is a perspective view illustrating a state in which the stack of FIG. 3 is disassembled to show an upper module unit, a plurality of middle module units, and a lower module unit.

As shown in FIGS. 3 and 4, the fuel cell stack 100S is formed by stacking an upper module unit 100P, a plurality of middle module units 100Q, and a lower module unit 100R.

Figure 5:
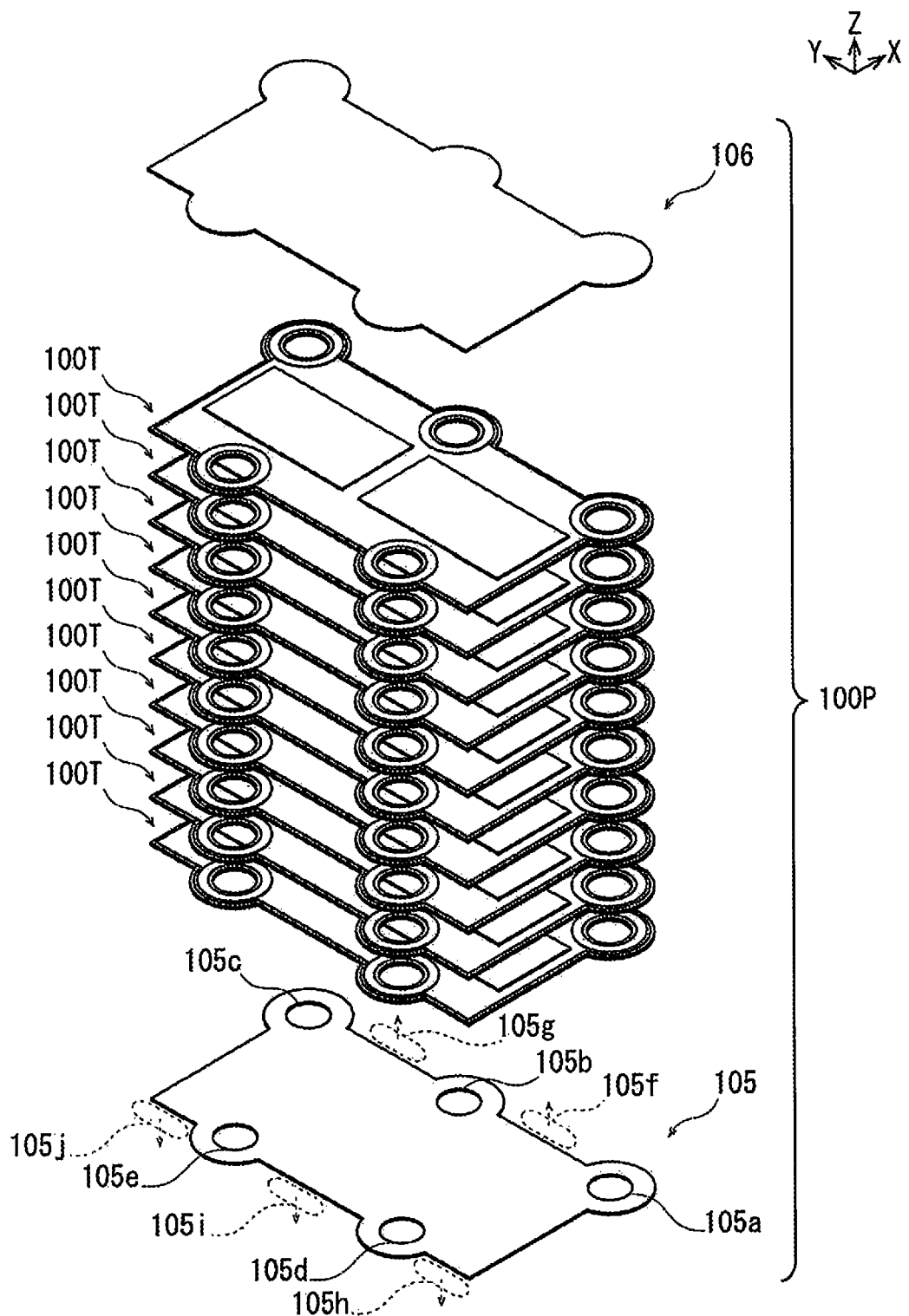
FIG. 5 is an exploded perspective view illustrating the upper module unit of FIG. 4.

As shown in FIG. 5, the upper module unit 100P is formed by sandwiching a plurality of stacked cell units 100T (corresponding to a fuel cell unit) from above and below with an upper collector plate 106 that outputs electric power generated by the cell units 100T to the outside, and a module end 105, which corresponds to an end plate.

Figure 6:
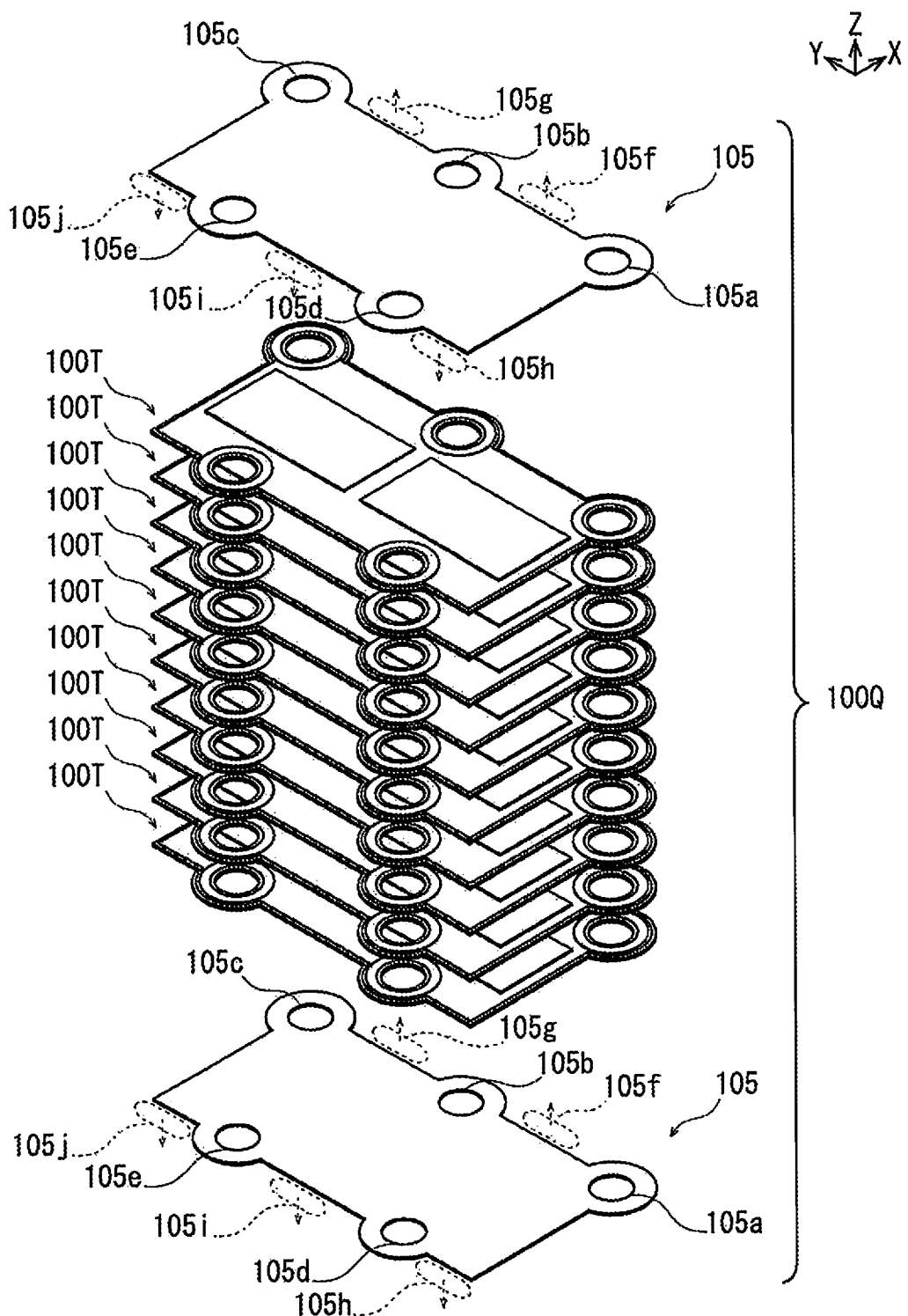
FIG. 6 is an exploded perspective view illustrating the middle module unit of FIG. 4.

As shown in FIG. 6, the middle module unit 100Q is formed by sandwiching a plurality of the stacked cell units 100T from above and below with a pair of the module ends 105.

Figure 7:
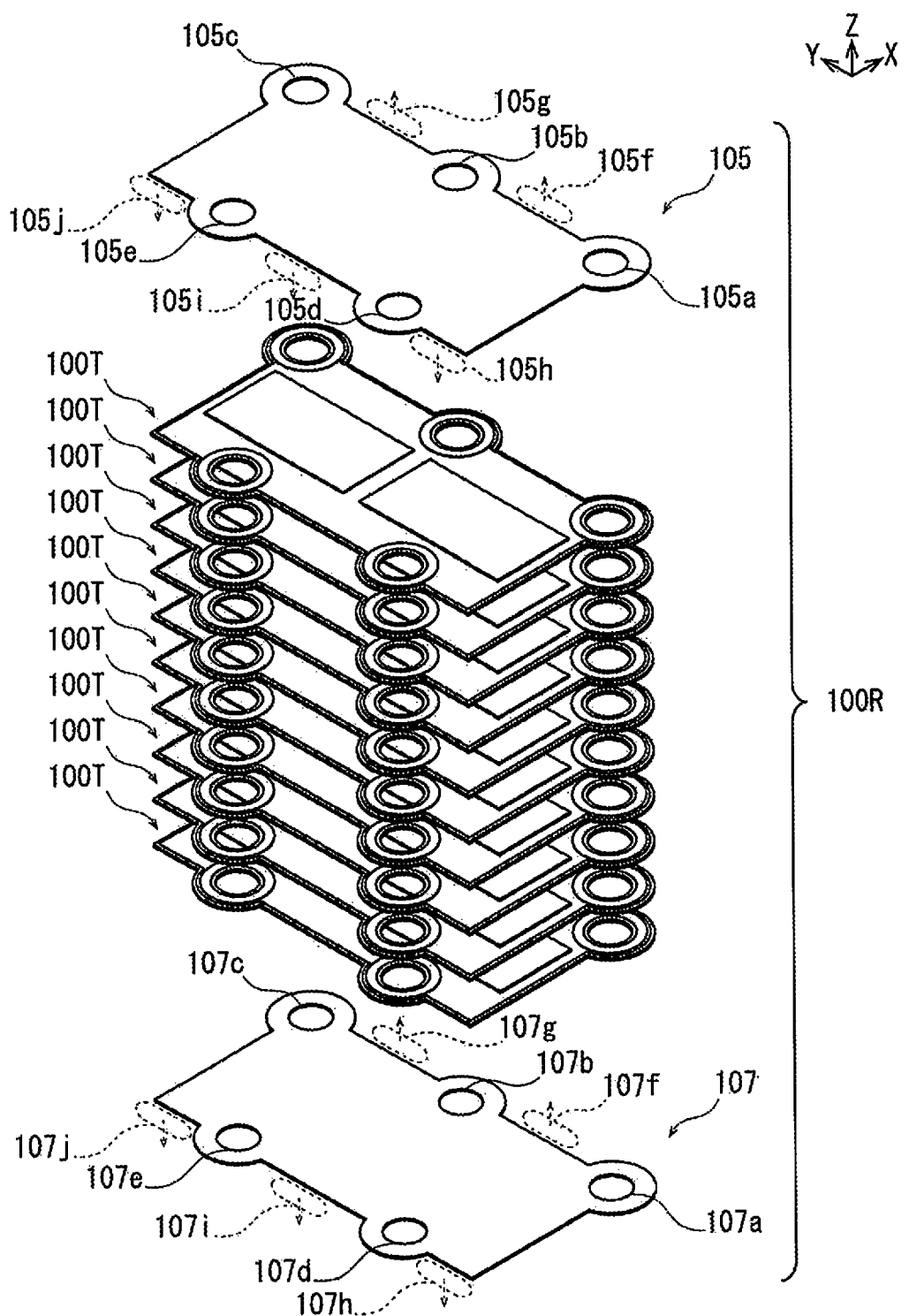
FIG. 7 is an exploded perspective view illustrating the lower module unit of FIG. 4.

As shown in FIG. 7, the lower module unit 100R is formed by sandwiching a plurality of the stacked cell units 100T from above and below with the module ends 105 and a lower collector plate 107.

Figure 8:
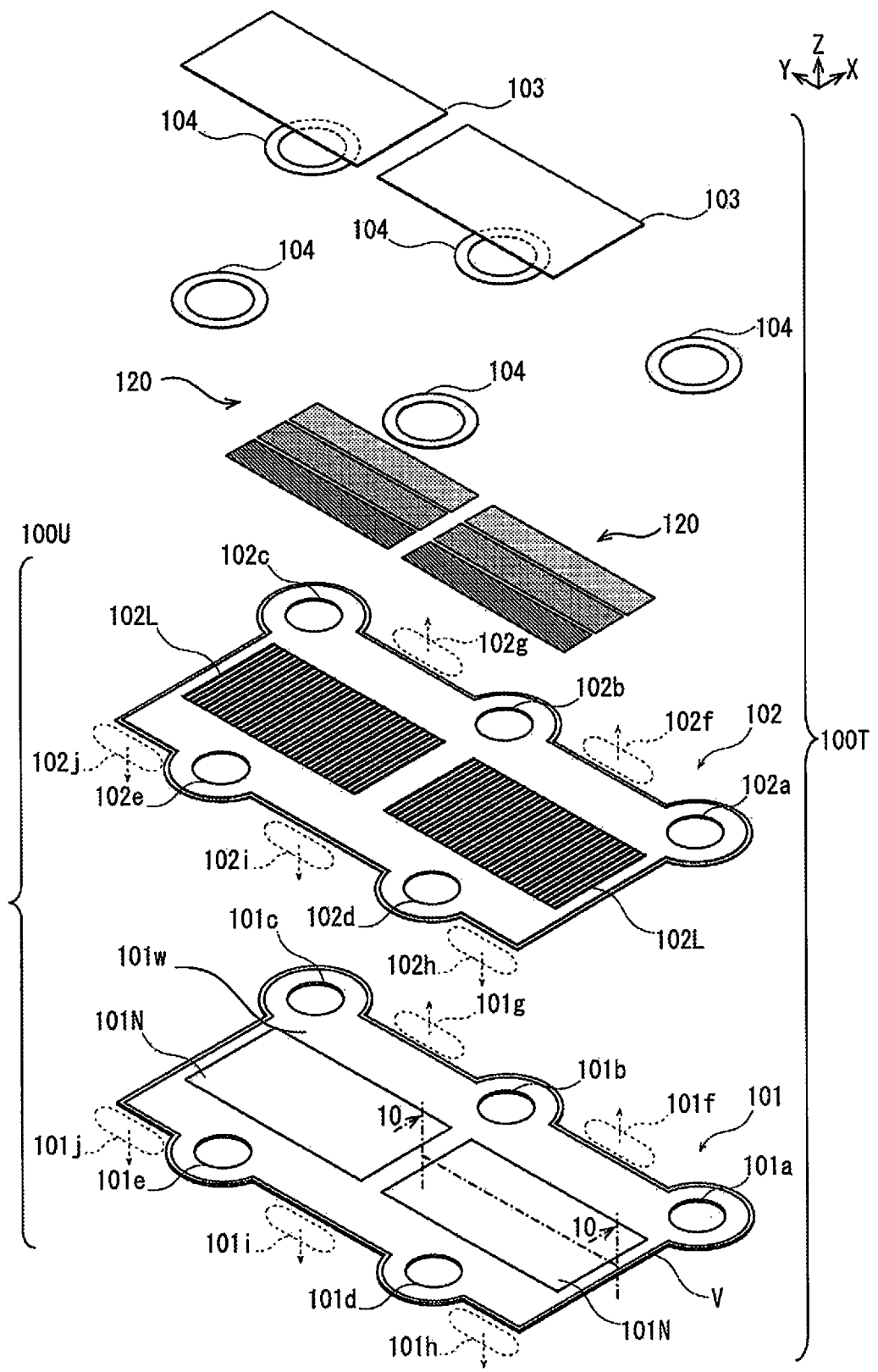
FIG. 8 is an exploded perspective view illustrating the cell unit of FIGS. 5 to 7.

As shown in FIG. 8, the cell unit 100T includes a metal support cell assembly 101 provided with metal support cells 101N having power generation cells 101M (not shown in FIG. 8) that generate power by using supplied gas, a separator 102 that separates adjacent power generation cells 101M, sealing members 104 that partially seal the gap between the metal support cell assembly 101 and the separator 102 and restricts the flow of the gas, and grid springs 120 that are in conductive contact with one of the power generation cells 101M and that generates an elastic force that presses the separator 102 toward another power generation cell 101M that is adjacent to the one power generation cell 101M.

As shown in FIG. 8, the metal support cell assembly 101 and the separator 102 constitute a joined body 100U by annular joining at the outer edges thereof along a joining line V. The cell unit 100T is formed by disposing the sealing members 104 between the joined body 100U and the joined body 100U that are vertically adjacent to each other.

The fuel cell stack 100S will be described below for each configuration.

Figure 9:
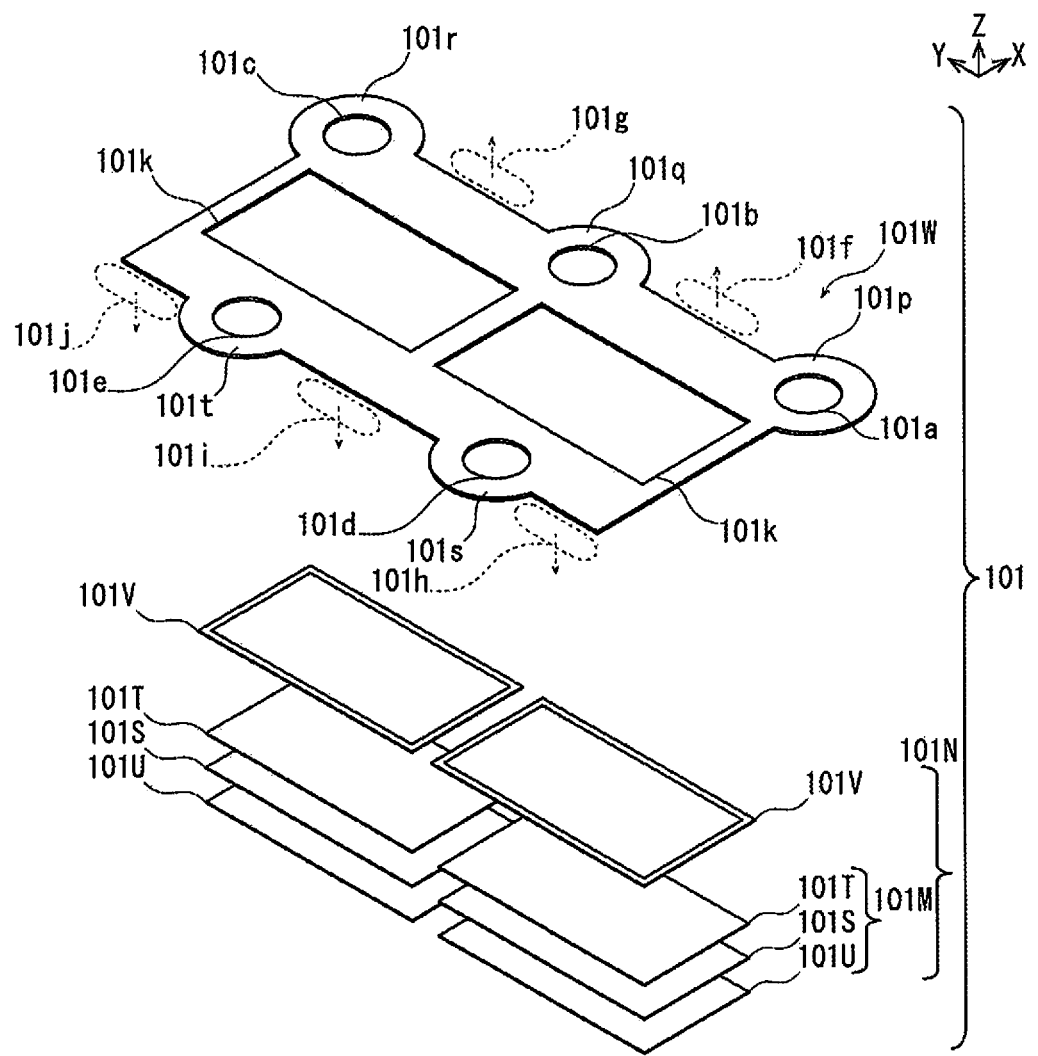
FIG. 9 is an exploded perspective view illustrating a metal support cell assembly of FIG. 8.
Figure 10:
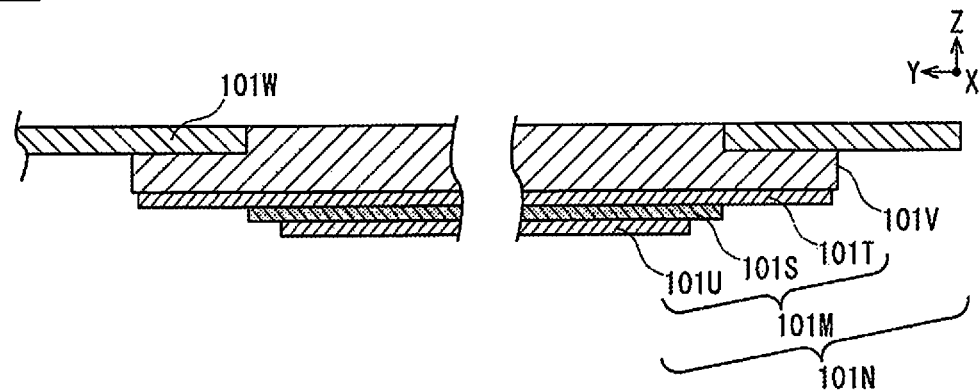
FIG. 10 is a cross-sectional view of the metal support cell assembly along line 10-10 in FIG. 8.

As shown in FIGS. 9 and 10, the metal support cell assembly 101 is provided with power generation cells 101M that generate power by using supplied gas.

In the metal support cell assembly 101, the power generation cell 101M is formed by sandwiching an electrolyte 101S between a fuel electrode-side electrode (anode 101T) and an oxidant electrode-side electrode (cathode 101U), as shown in FIGS. 9 and 10. The metal support cell 101N is configured from the power generation cell 101M and a support metal 101V that supports the power generation cell 101M from one side. The metal support cell assembly 101 is configured from a pair of metal support cells 101N and a cell frame 101W that holds the pair of metal support cells 101N from the periphery. In the metal support cell assembly 101, the power generation cell 101M is formed by sandwiching the electrolyte 101S with the anode 101T and the cathode 101U, as shown in FIGS. 9 and 10.

As shown in FIGS. 9 and 10, the electrolyte 101S allows oxide ions to pass from the cathode 101U to the anode 101T. The electrolyte 101S allows oxide ions to pass but does not allow gas and electrons to pass. The electrolyte 101S is formed into a rectangular parallelepiped shape. The electrolyte 101S is made of a solid oxide ceramic, such as stabilized zirconia in which yttria, neodymium oxide, samaria, gadria, scandia, and the like are dissolved.

As shown in FIGS. 9 and 10, the anode 101T is a fuel electrode and reacts an anode gas AG (for example, hydrogen) with oxide ions to thereby generate an oxide of the anode gas AG and extract electrons. The anode 101T is resistant to a reducing atmosphere, allows the anode gas AG to pass therethrough, has high electrical conductivity, and has a catalytic action to react the anode gas AG with the oxide ions. The anode 101T is formed into a rectangular parallelepiped shape that is larger than the electrolyte 101S. The anode 101T is made of cemented carbide, in which, for example, a metal such as nickel and an oxide ion conductor such as yttria-stabilized zirconia are mixed.

As shown in FIGS. 9 and 10, the cathode 101U is an oxidant electrode, and reacts a cathode gas CG (for example, oxygen contained in air) with electrons to convert oxygen molecules into oxide ions. The cathode 101U is resistant to an oxidizing atmosphere, allows the cathode gas CG to pass therethrough, has high electrical conductivity, and has a catalytic action to convert oxygen molecules into oxide ions. The cathode 101U is formed into a rectangular parallelepiped shape that is smaller than the electrolyte 101S. The cathode 101U is made of an oxide of, for example, lanthanum, strontium, manganese, or cobalt.

As shown in FIGS. 9 and 10, the support metal 101V supports the power generation cells 101M on the anode 101T side. The support metal 101V has gas permeability, high electrical conductivity, and sufficient strength. The support metal 101V is formed into a rectangular parallelepiped shape that is sufficiently larger than the anode 101T. The support metal 101V is made of, for example, stainless steel, corrosion-resistant steel, or a corrosion-resistant alloy containing nickel and chromium.

As shown in FIGS. 9 and 10, the cell frame 101W holds the metal support cell 101N from the periphery. The cell frame 101W is formed into a thin rectangular shape. The cell frame 101W is provided with a pair of openings 101k along the longitudinal direction Y. Each of the pair of openings 101k of the cell frame 101W is formed of a rectangular through-hole, and is smaller than the outer shape of the support metal 101V. The cell frame 101W is made of metal, and is insulated with an insulating material or a coating. The insulating material is formed, for example, by fixing aluminum oxide onto the cell frame 101W. The outer edge of the support metal 101V is joined to the inner edge of the opening 101k of the cell frame 101W to thereby join the metal support cell assembly 101 to the cell frame 101W.

As shown in FIGS. 9 and 10, the cell frame 101W is provided with circular extended portions (first extended portion 101p, second extended portion 101q, and third extended portion 101r) extending in the planar direction from the right end, the center, and the left end of one side along the longitudinal direction Y. The cell frame 101W is provided with circular extended portions (fourth extended portion 101s and fifth extended portion 101t) extending in the planar direction from two locations separated from the center of the other side along the longitudinal direction Y. In the cell frame 101W, the fourth extended portion 101s and the fifth extended portion 101t are located alternatingly with respect to the first extended portion 101p, the second extended portion 101q, and the third extended portion 101r, and separated therefrom by the pair of openings 101k, in the longitudinal direction Y.

As shown in FIGS. 9 and 10, in the cell frame 101W, an anode-side first inlet 101a, an anode-side second inlet 101b, and an anode-side third inlet 101c through which the anode gas AG passes (flows) are provided in the first extended portion 101p, the second extended portion 101q, and the third extended portion 101r, respectively. In the cell frame 101W, an anode-side first outlet 101d and an anode-side second outlet 101e through which the anode gas AG passes (flows) are provided in the fourth extended portion 101s and the fifth extended portion 101t, respectively. The anode-side first inlet 101a, the anode-side second inlet 101b, the anode-side third inlet 101c, the anode-side first outlet 101d, and the anode-side second outlet 101e of the anode gas AG are so-called manifolds.

As shown in FIG. 9, in the cell frame 101W, a cathode-side first inlet 101f through which the cathode gas CG passes (flows) is provided in the space between the first extended portion 101p and the second extended portion 101q. In the cell frame 101W, a cathode-side second inlet 101g through which the cathode gas CG passes (flows) is provided in the space between the second extended portion 101q and the third extended portion 101r. In the cell frame 101W, a cathode-side first outlet 101h through which the cathode gas CG passes (flows) is provided on the right side of the fourth extended portion 101s in FIG. 9. In the cell frame 101W, a cathode-side second outlet 101i through which the cathode gas CG passes (flows) is provided in the space between the fourth extended portion 101s and the fifth extended portion 101t. In the cell frame 101W, a cathode-side third outlet 101j through which the cathode gas CG passes (flows) is pro-vided on the left side of the fifth extended portion 101t in FIG. 9. In the cell frame 101W, the cathode-side first inlet 101f, the cathode-side second inlet 101g, the cathode-side first outlet 101h, the cathode-side second outlet 101i, and the cathode-side third outlet 101j correspond to the space between the outer circumferential surface of the cell frame 101W and the inner-side surface of the air shelter 110.

Figure 15:
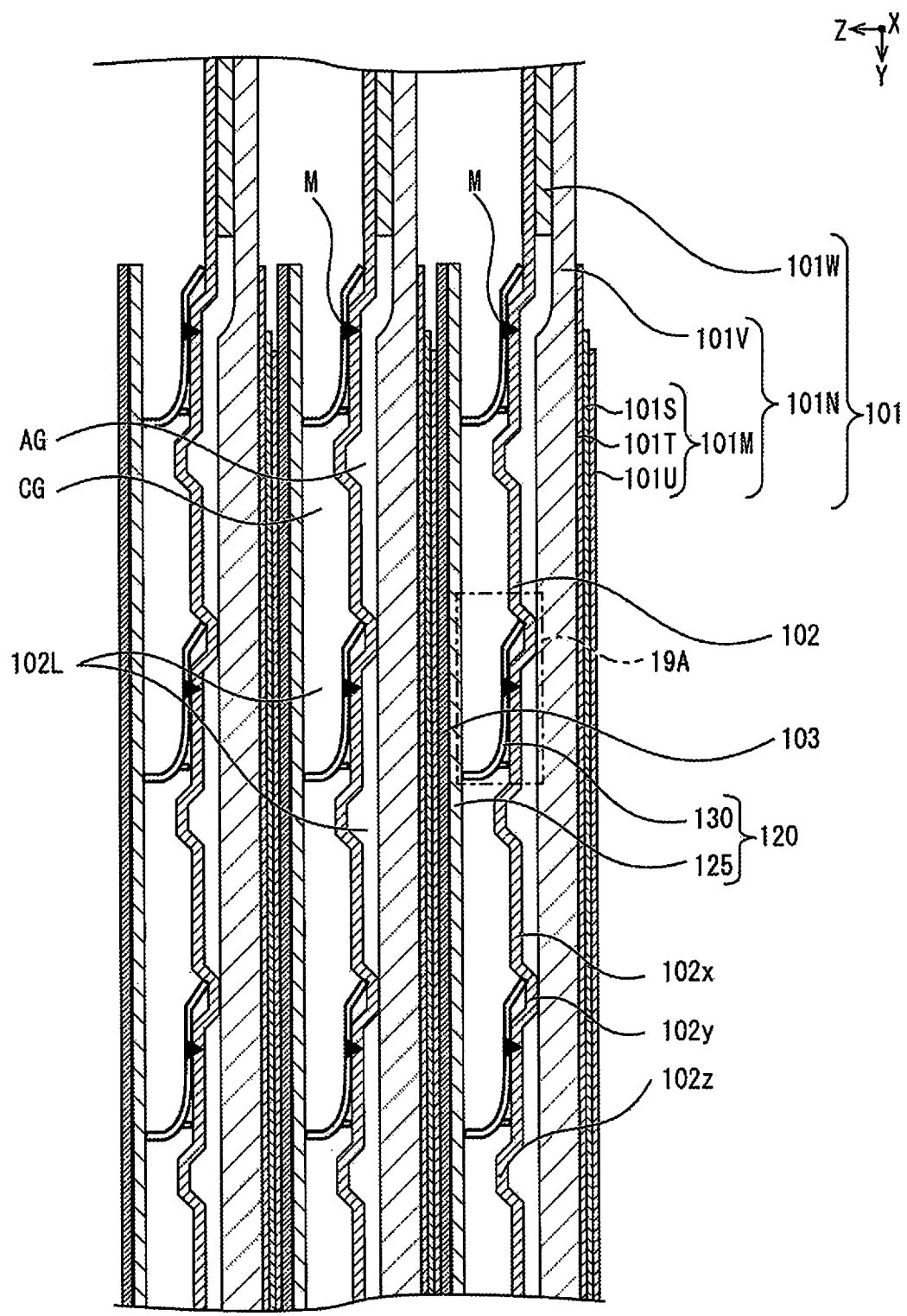
FIG. 15 is a cross-sectional view partially (region 15 in FIG. 11) illustrating a state in which an auxiliary collector layer, the separator, and the metal support cell assembly of FIG. 8 are stacked.

As shown in FIG. 15, the separator 102 defines flow path portions 102L, which are flow passages for the anode gas AG and the cathode gas CG between the separator and the power generation cells 101M. The separator 102 is in conductive contact with the metal support cell 101N.

The separator 102 is disposed opposing the metal support cell assembly 101. The separator 102 has the same outer shape as the metal support cell assembly 101. The separator 102 is made of metal, and is insulated using an insulating material or a coating, excluding regions (flow path portions 102L) opposing the power generation cells 101M. The insulating material is formed, for example, by fixing aluminum oxide onto the separator 102. The separator 102 is provided with a pair of the flow path portions 102L arranged side by side in the longitudinal direction Y so as to oppose the power generation cells 101M.

Figure 11:
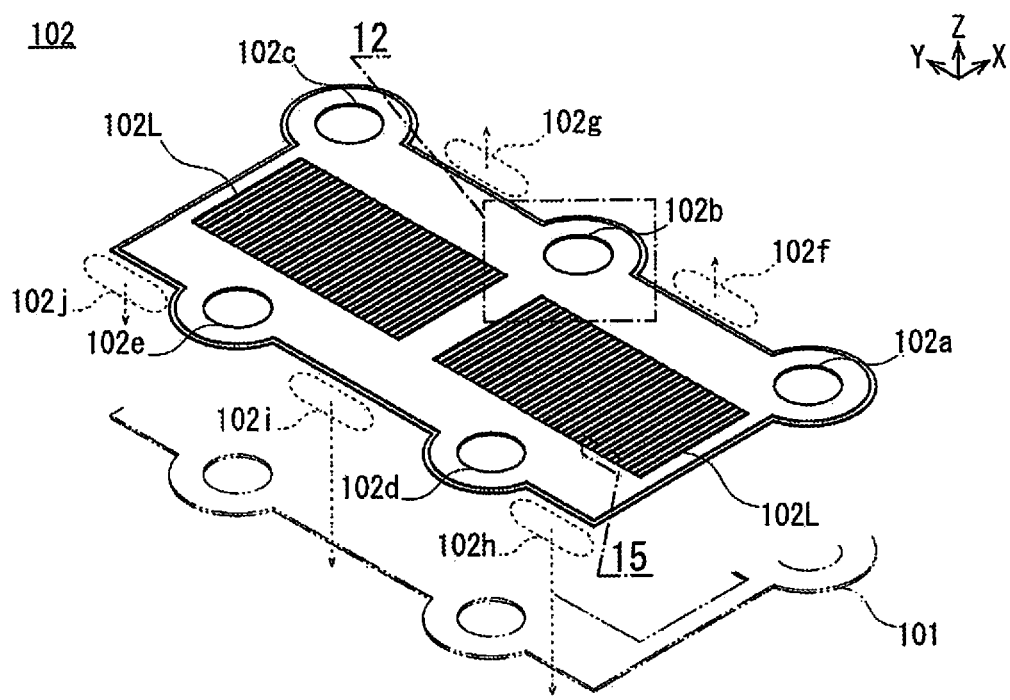
FIG. 11 is a perspective view illustrating the separator of FIG. 8 from a cathode side (side in which the separator 102 is viewed from above as in FIG. 8).
Figure 12:
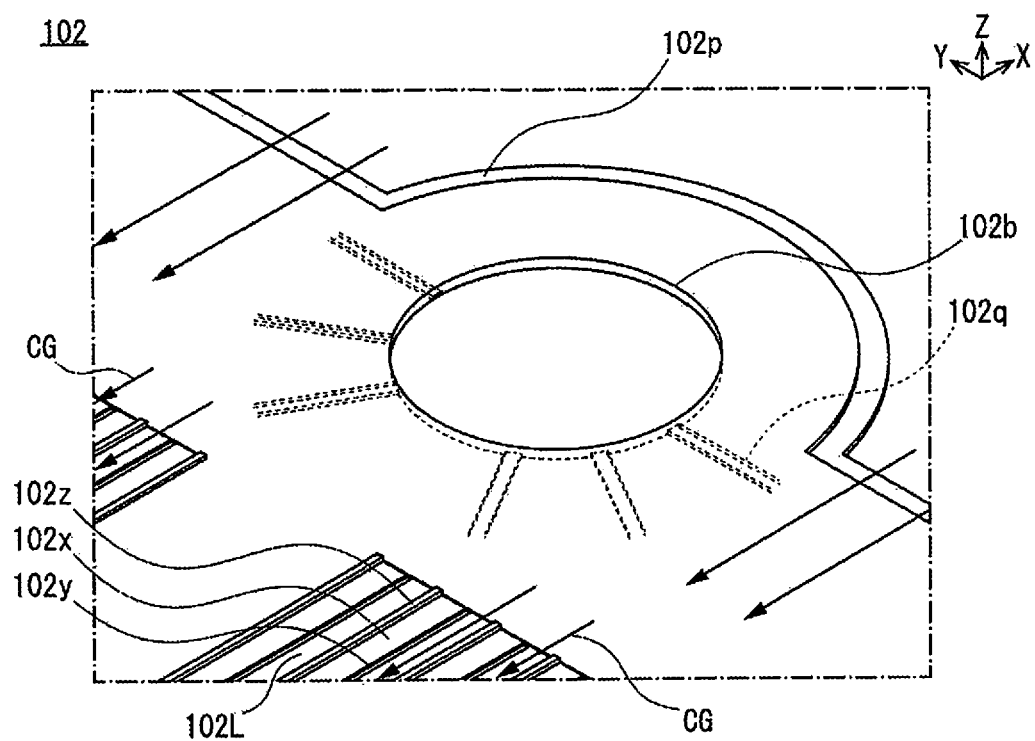
FIG. 12 is a perspective view partially (region 12 in FIG. 11) illustrating the separator of FIG. 11.
Figure 13:
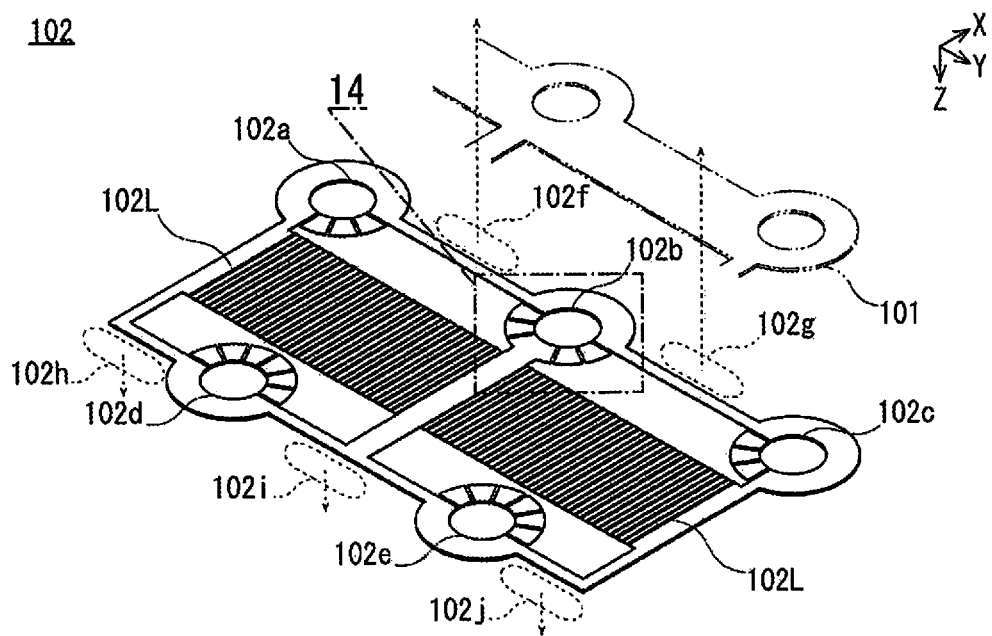
FIG. 13 is a perspective view illustrating the separator of FIG. 8 from an anode side (side in which the separator 102 is viewed from below, unlike in FIG. 8).
Figure 14:
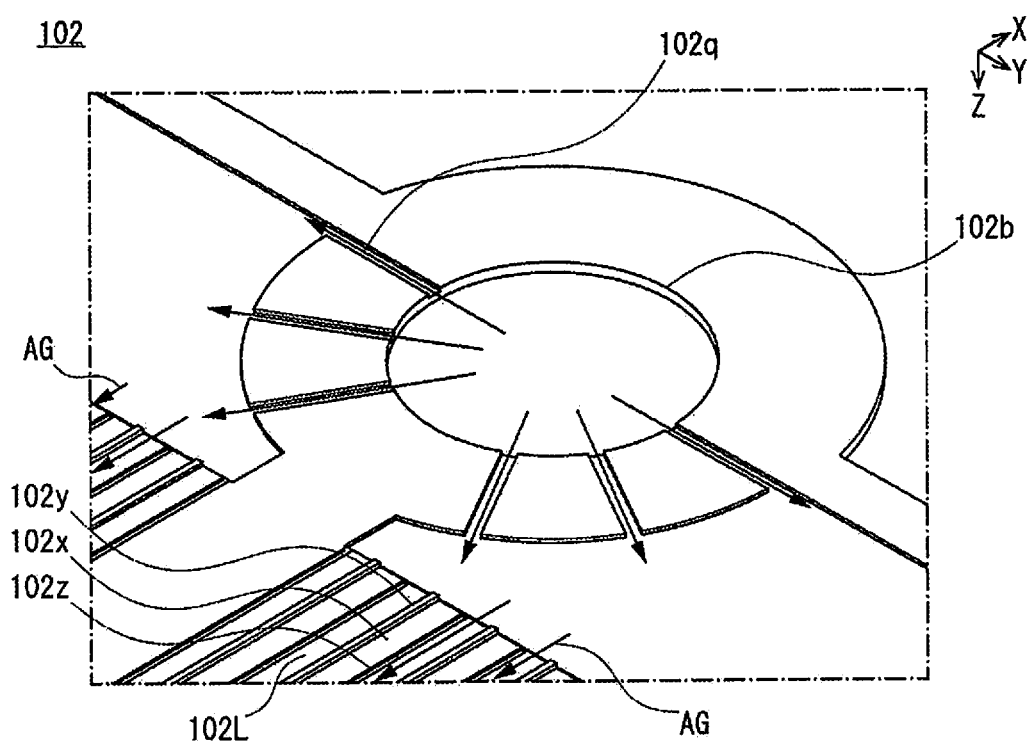
FIG. 14 is a perspective view partially (region 14 in FIG. 13) illustrating the separator of FIG. 13.

As shown in FIG. 8 as well as FIGS. 11-15, in the separator 102, the flow path portions 102L are formed by arranging flow paths that extend along the direction of the flow of the gas (transverse direction X) in the direction (longitudinal direction Y) orthogonal to the direction of the flow of the gas (transverse direction X). As shown in FIGS. 12, 14, and 15, concave portions 102y are provided in the flow path portions 102L at regular intervals, so as to be recessed downward from flat portions 102x, in a plane defined by the longitudinal direction Y and the transverse direction X. The concave portions 102y extend along the direction of the flow of the gas (transverse direction X). The concave portions 102y are recessed downward from the lower end of the separator 102. As shown in FIGS. 12, 14, and 15, convex portions 102z are provided in the flow path portions 102L at regular intervals, so as to protrude upward from the flat portions 102x. The convex portions 102z extend along the direction of the flow of the gas (transverse direction X). The convex portions 102z protrude upward from the upper end of the separator 102. In the flow path portions 102L, the concave portions 102y and the convex portions 102z are alternatingly provided along the longitudinal direction Y, separated by the flat portions 102x.

As shown in FIG. 15, in the separator 102, the gap between the flow path portion 102L and the metal support cell assembly 101 located below (on the right in FIG. 15) is configured to be the flow path of the anode gas AG. The anode gas AG flows from an anode-side second inlet 102b of the separator 102, shown in FIG. 13, and the like, through a plurality of grooves 102q, shown in FIGS. 13 and 14, into the flow path portion 102L on the anode side. As shown in FIGS. 13 and 14, in the separator 102, the plurality of grooves 102q are formed from each of an anode-side first inlet 102a, the anode-side second inlet 102b, and an anode-side third inlet 102c, radially toward the flow path portion 102L on the anode side. As shown in FIGS. 12 and 15, in the separator 102, the gap between the flow path portion 102L and the metal support cell assembly 101 located above (on the left in FIG. 15) is configured to be the flow path of the cathode gas CG. The cathode gas CG flows from a cathode-side first inlet 102f and a cathode-side second inlet 102g of the separator 102 shown in FIG. 11, over an outer edge 102p on the cathode side of the separator 102 shown in FIGS. 11 and 12, into the flow path portion 102L on the cathode side.

As shown in FIG. 12, in the separator 102, the outer edge 102p on the cathode side is formed to be thinner than the other portions.

As shown in FIGS. 8, 11, and 13, the separator 102 is provided with the anode-side first inlet 102a, the anode-side second inlet 102b, the anode-side third inlet 102c, an anode-side first outlet 102d, and an anode-side second outlet 102e through which the anode gas AG passes, such that the relative position with the metal support cell assembly 101 matches along the stacking direction Z. The separator 102 is provided with the cathode-side first inlet 102f, the cathode-side second inlet 102g, a cathode-side first outlet 102h, a cathode-side second outlet 102i, and a cathode-side third outlet 102j through which the cathode gas CG passes, such that the relative position with the metal support cell assembly 101 matches along the stacking direction Z. In the separator 102, the cathode-side first inlet 102f, the cathode-side second inlet 102g, the cathode-side first outlet 102h, the cathode-side second outlet 102i, and the cathode-side third outlet 102j correspond to the space between the outer circumferential surface of the separator 102 and the inner-side surface of the air shelter 110.

As shown in FIGS. 8 and 15, the grid spring 120 presses the separator 102 toward the power generation cell 101M. The grid spring 120 is in conductive contact with the power generation cell 101M via an auxiliary collector layer 103.

The auxiliary collector layer 103 forms a space through which the cathode gas CG passes between the power generation cell 101M and the grid spring 120, equalizes the surface pressure, and assists the electrical contact between the power generation cell 101M and the grid spring 120.

The auxiliary collector layer 103 is a so-called expanded metal. The auxiliary collector layer 103 is disposed between the power generation cell 101M and the flow path portions 102L of the separator 102. The auxiliary collector layer 103 has the same outer shape as the power generation cell 101M. The auxiliary collector layer 103 has a wire mesh shape in which rhomboidal, etc., openings are provided in a lattice pattern.

The sealing members 104 are so-called gaskets, which function as a spacer and a seal.

As shown in FIG. 8, the sealing members 104 are disposed between the cell frame 101W and the separator 102 and partially seals the gap between the cell frame 101W and the separator 102 to thereby restrict the flow of the gas.

The sealing members 104 prevent the anode gas AG from becoming mixed toward the cathode-side flow path of the separator 102 from an anode-side inlet (for example, the anode-side first inlet 102a) and an anode-side outlet (for example, anode-side first outlet 102d) of the separator 102.

As shown in FIGS. 5 to 7, the module end 105 is a plate that holds the lower end or the upper end of the plurality of stacked cell units 100T.

The module end 105 is disposed at the lower end or the upper end of the plurality of stacked cell units 100T. The module end 105 has the same outer shape as the cell units 100T. The module end 105 is made of a conductive material that does not allow gas to permeate therethrough and, except for partial regions that oppose the power generation cells 101M and the other module ends 105, is insulated using an insulating material or a coating. The insulating material is formed, for example, by fixing aluminum oxide onto the module end 105.

The module end 105 is provided with an anode-side first inlet 105a, an anode-side second inlet 105b, an anode-side third inlet 105c, an anode-side first outlet 105d, and an anode-side second outlet 105e through which the anode gas AG passes, such that the relative position with the cell units 100T matches along the stacking direction Z. The module end 105 is provided with a cathode-side first inlet 105f, a cathode-side second inlet 105g, a cathode-side first outlet 105h, a cathode-side second outlet 105i, and a cathode-side third outlet 105j through which the cathode gas CG passes, such that the relative position with the cell units 100T matches along the stacking direction Z. In the module end 105, the cathode-side first inlet 105f, the cathode-side second inlet 105g, the cathode-side first outlet 105h, the cathode-side second outlet 105i, and the cathode-side third outlet 105j correspond to the space between the outer circumferential surface of the module end 105 and the inner-side surface of the air shelter 110.

The upper collector plate 106 is shown in FIG. 5 and outputs electric power generated by the cell units 100T to the outside.

As shown in FIG. 5, the upper collector plate 106 is positioned at the upper end of the upper module unit 100P. The upper collector plate 106 has the same outer shape as the cell units 100T. The upper collector plate 106 is provided with a terminal (not shown) that is connected to an external energizing member. The upper collector plate 106 is made of a conductive material that does not allow gas to permeate therethrough, and is insulated using an insulating material or a coating, excluding the terminal portion and regions that oppose the power generation cells 101M of the cell units 100T. The insulating material is formed, for example, by fixing aluminum oxide onto the upper collector plate 106.

The lower collector plate 107 is shown in FIG. 7, and outputs electric power generated by the cell units 100T to the outside.

As shown in FIG. 7, the lower collector plate 107 is positioned at the lower end of the lower module unit 100R. The lower collector plate 107 has the same outer shape as the upper collector plate 106. The lower collector plate 107 is provided with a terminal (not shown) that is connected to an external energizing member. The lower collector plate 107 is made of a conductive material that does not allow gas to permeate therethrough and, except for the terminal portion and regions that oppose the power generation cells 101M of the cell units 100T, is insulated using an insulating material or a coating. The insulating material is formed, for example, by fixing aluminum oxide onto the lower collector plate 107.

The lower collector plate 107 is provided with an anode-side first inlet 107a, an anode-side second inlet 107b, an anode-side third inlet 107c, an anode-side first outlet 107d, and an anode-side second outlet 107e through which the anode gas AG passes, such that the relative position with the cell units 100T matches along the stacking direction Z. The lower collector plate 107 is provided with a cathode-side first inlet 107f, a cathode-side second inlet 107g, a cathode-side first outlet 107h, a cathode-side second outlet 107i, and a cathode-side third outlet 107j through which the cathode gas CG passes, such that the relative position with the cell units 100T matches along the stacking direction Z. In the lower collector plate 107, the cathode-side first inlet 107f, the cathode-side second inlet 107g, the cathode-side first outlet 107h, the cathode-side second outlet 107i, and the cathode-side third outlet 107j correspond to the space between the outer circumferential surface of the lower collector plate 107 and the inner-side surface of the air shelter 110.

As shown in FIGS. 2 and 3, the lower end plate 108 holds the fuel cell stack 100S from below.

The lower end plate 108 is disposed at the lower end of the fuel cell stack 100S. Except for a part, the lower end plate 108 has the same outer shape as the cell units 100T. Two ends of the lower end plate 108 are formed by linearly extending both ends along the longitudinal direction Y in order to form an inlet and an outlet for the cathode gas CG. The lower end plate 108 is formed sufficiently thicker than the cell units 100T. The lower end plate 108 is made of metal, for example, and the upper surface thereof that contacts the lower collector plate 107 is insulated using an insulating material or a coating. The insulating material is formed, for example, by fixing aluminum oxide onto the lower end plate 108.

The lower end plate 108 is provided with an anode-side first inlet 108a, an anode-side second inlet 108b, an anode-side third inlet 108c, an anode-side first outlet 108d, and an anode-side second outlet 108e through which the anode gas AG passes, such that the relative position with the cell units 100T matches along the stacking direction Z. The lower end plate 108 is provided with a cathode-side first inlet 108f, a cathode-side second inlet 108g, a cathode-side first outlet 108h, a cathode-side second outlet 108i, and a cathode-side third outlet 108j through which the cathode gas CG passes, such that the relative position with the cell units 100T matches along the stacking direction Z.

As shown in FIGS. 2 and 3, the upper end plate 109 holds the fuel cell stack 100S from above.

The upper end plate 109 is disposed at the upper end of the fuel cell stack 100S. The upper end plate 109 has the same outer shape as the lower end plate 108. Unlike the lower end plate 108, the upper end plate 109 is not provided with an inlet and an outlet for the gas. The upper end plate 109 is made of metal, for example, and the lower surface thereof that contacts the upper collector plate 106 is insulated using an insulating material or a coating. The insulating material is formed, for example, by fixing aluminum oxide onto the upper end plate 109.

As shown in FIGS. 2 and 3, the air shelter 110 forms a flow path for the cathode gas CG between the air shelter and the fuel cell stack 100S.

As shown in FIGS. 2 and 3, the air shelter 110 covers the fuel cell stack 100S, which is sandwiched between the lower end plate 108 and the upper end plate 109, from the top. The air shelter 110 forms the inlet and the outlet for the cathode gas CG, which is a constituent element of the fuel cell stack 100S, with a gap between the inner-side surface of the air shelter 110 and the side surface of the fuel cell stack 100S. The air shelter 110 has a box-like shape, with the entire lower portion and part of the side portion open. The air shelter 110 is made of metal, for example, and the inner-side surface thereof is insulated using an insulating material or a coating. The insulating material is formed, for example, by fixing aluminum oxide onto the air shelter 110.

As shown in FIGS. 1 and 2, the external manifold 111 supplies gas from the outside to the plurality of cell units 100T.

The external manifold 111 is disposed below the cell stack assembly 100M. The external manifold 111 has an outer shape obtained by simplifying the shape of the lower end plate 108. The external manifold 111 is formed sufficiently thicker than the lower end plate 108. The external manifold 111 is made of metal, for example.

The external manifold 111 is provided with an anode-side first inlet 111a, an anode-side second inlet 111b, an anode-side third inlet 111c, an anode-side first outlet 111d, and an anode-side second outlet 111e through which the anode gas AG passes, such that the relative position with the cell units 100T matches along the stacking direction Z. The external manifold 111 is provided with a cathode-side first inlet 111f, a cathode-side second inlet 111g, a cathode-side first outlet 111h, a cathode-side second outlet 111i, and a cathode-side third outlet 111j through which the cathode gas CG passes, such that the relative position with the cell units 100T matches along the stacking direction Z.

As shown in FIGS. 1 and 2, the cover 112 covers and protects the cell stack assembly 100M.

The cover 112 sandwiches the cell stack assembly 100M from above and below together with the external manifold 111. The cover 112 has a box-like shape, with an open lower portion. The cover 112 is made of metal, for example, the inner surface of which is insulated with an insulating material.

Flow of Gas in Fuel Cell Stack 100S

Figure 16A:
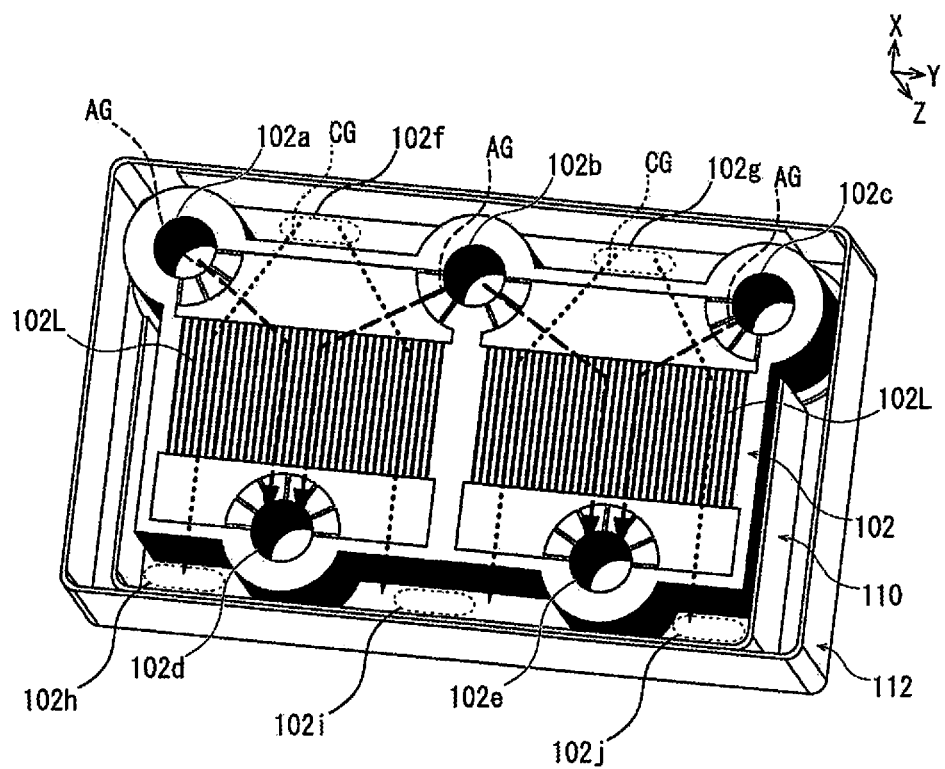
FIG. 16A is a perspective view schematically illustrating the flow of anode gas and cathode gas in the fuel cell stack.
Figure 16B:
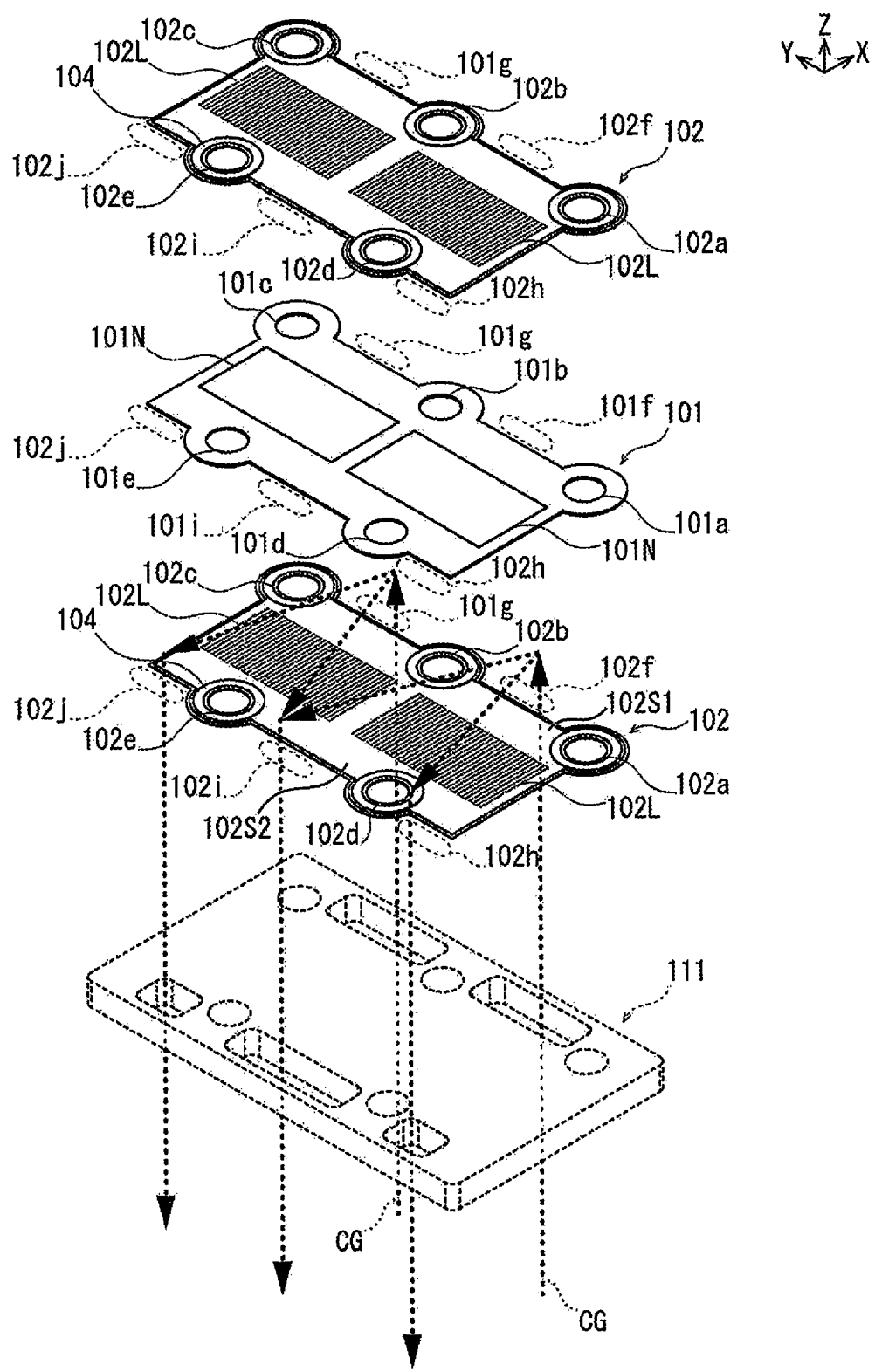
FIG. 16B is a perspective view schematically illustrating the flow of the cathode gas in the fuel cell stack.
Figure 16C:
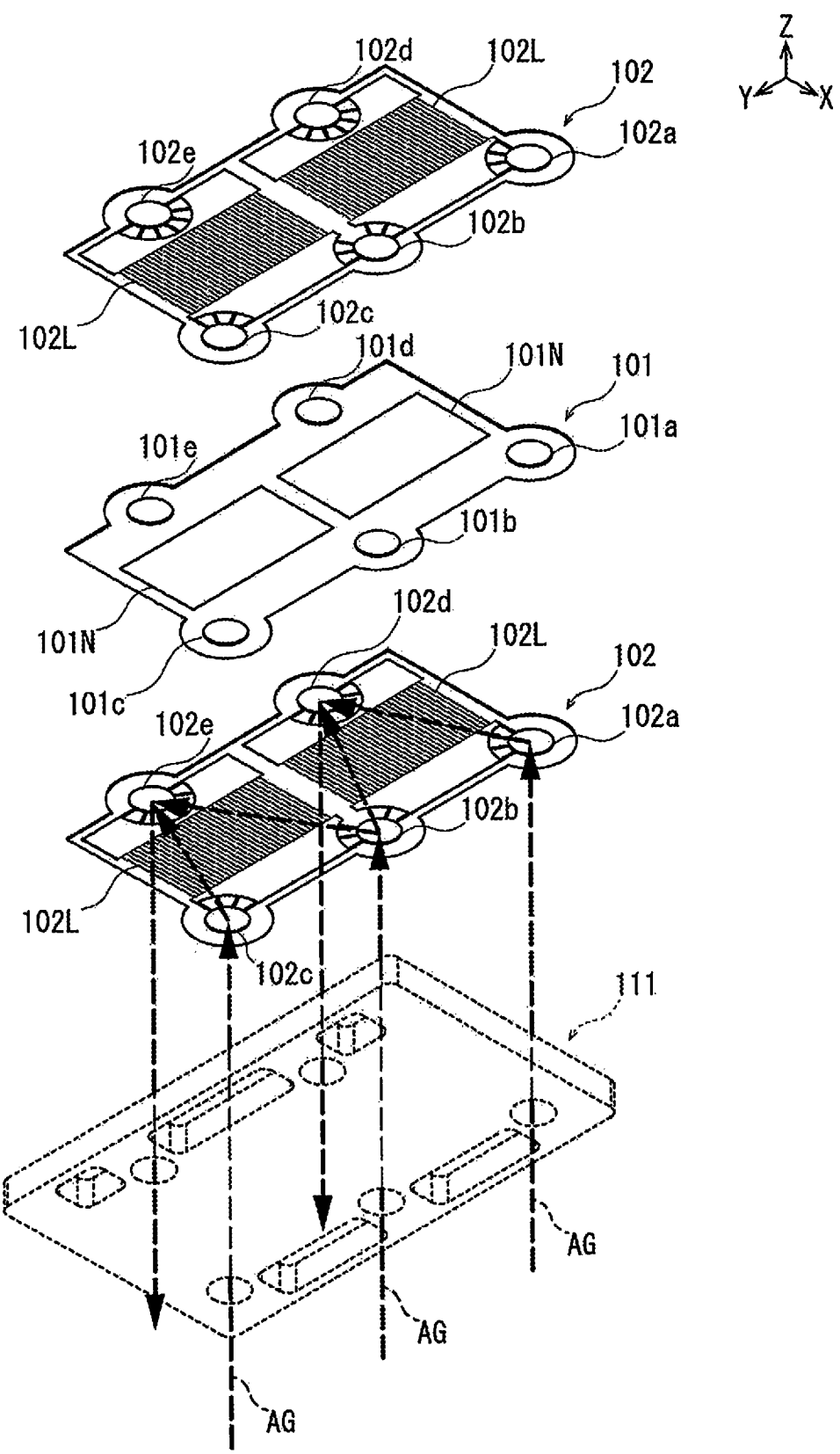
FIG. 16C is a perspective view schematically illustrating the flow of the anode gas in the fuel cell stack.

FIG. 16A is a perspective view schematically illustrating the flow of the anode gas AG in the fuel cell stack 100S. FIG. 16B is a perspective view schematically illustrating the flow of the cathode gas CG in the fuel cell stack 100S.

The anode gas AG passes through the respective inlets of the external manifold 111, the lower end plate 108, the module end 105, the separator 102, and the metal support cell assembly 101 and is supplied to the anode 101T of each of the power generation cells 101M. That is, the anode gas AG is distributed and supplied to the flow path on the anode side provided in the gap between the separator 102 and the metal support cell assembly 101, which are stacked in alternating fashion from the external manifold 111 to the terminal upper collector plate 106. Thereafter, the anode gas AG reacts in the power generation cells 101M, passes through the respective outlets of each of the constituent elements described above, and is discharged in the form of exhaust gas.

In FIG. 16A, the anode gas AG passes through the anode-side first inlet 102a, the anode-side second inlet 102b, and the anode-side third inlet 102c of the separator 102 positioned below in FIG. 16A, passes through the anode-side first inlet 101a, the anode-side second inlet 101b, and the anode-side third inlet 101c of the metal support cell assembly 101, then flows into the flow path portions 102L of the separator 102 positioned above in FIG. 16A, and is supplied to the anodes 101T of the power generation cells 101M of the metal support cell assembly 101. The anode gas AG that has reacted in the anode 101T flows out of the flow path portions 102L of the separator 102 positioned above in FIG. 16A in the form of exhaust gas, passes through the anode-side first outlet 101d and the anode-side second outlet 101e of the metal support cell assembly 101, passes through the anode-side first outlet 102d and the anode-side second outlet 102e of the separator 102 positioned below in FIG. 16A, and is discharged to the outside.

The cathode gas CG passes through the respective inlets of the external manifold 111, the lower end plate 108, the module end 105, the separator 102, and the metal support cell assembly 101 and is supplied to the cathodes 101U of the power generation cells 101M. That is, the cathode gas CG is distributed and supplied to the flow path on the cathode side provided in the gap between the metal support cell assembly 101 and the separator 102, which are stacked in alternating fashion from the external manifold 111 to the terminal upper collector plate 106. The cathode gas CG then reacts in the power generation cells 101M, passes through the respective outlets of each of the constituent elements described above, and is discharged in the form of exhaust gas. The cathode gas CG is supplied from one end 102S1 of the separator 102 and flows along the planar direction of the separator 102 toward the other end 102S2 opposing the one end 102S1 (refer to FIG. 16B). The inlet and the outlet of the cathode gas CG in each of the constituent elements described above are configured by the gaps between the outer circumferential surface of each constituent element and the inner-side surface of the air shelter 110.

In FIG. 16B, the cathode gas CG passes through the cathode-side first inlet 102f and the cathode-side second inlet 102g of the separator 102 positioned below in FIG. 16B, flows into the flow path portions 102L of the separator 102, and is supplied to the cathodes 101U of the power generation cells 101M of the metal support cell assembly 101. The cathode gas CG that has reacted in the cathode 101U flows out of the flow path portions 102L of the separator 102 positioned below in FIG. 16B in the form of exhaust gas, passes through the cathode-side first outlet 102h, the cathode-side second outlet 102i, and the cathode-side third outlet 102j of the separator 102, and is discharged to the outside.

Grid Spring 120

Figure 17A:
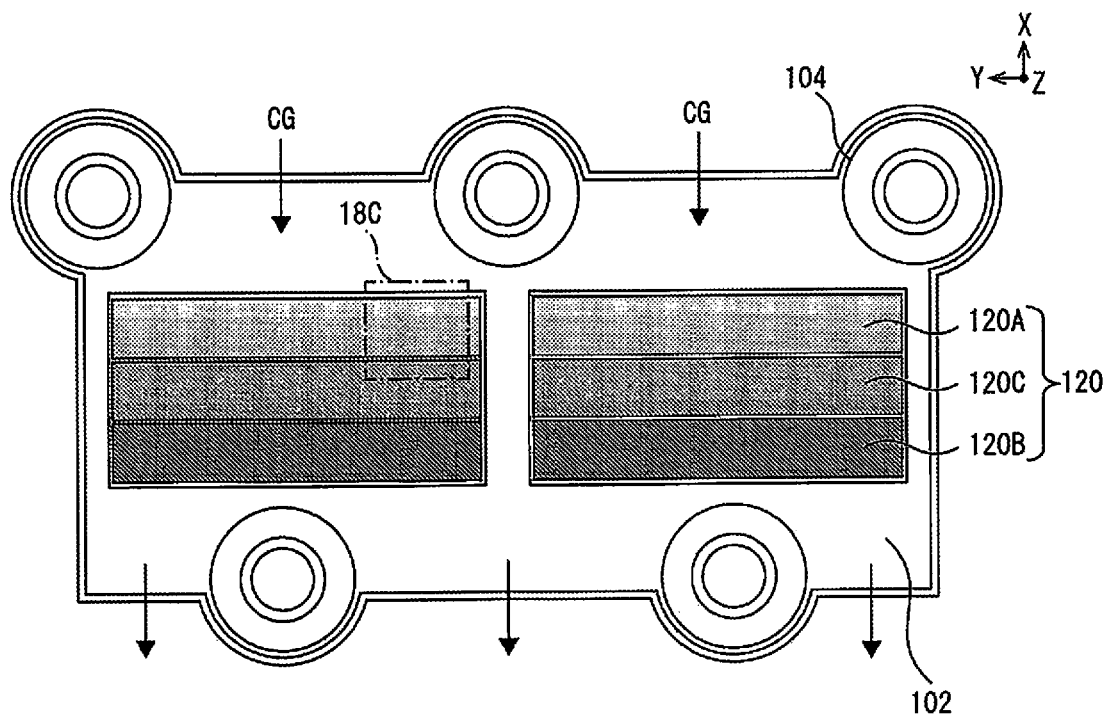
FIG. 17A is a plan view illustrating the cell unit according to an embodiment, with the auxiliary collector layer omitted.

As shown in FIG. 17A, the grid spring 120 includes a first grid spring 120A disposed on the upstream side of the flow of the cathode gas CG, a second grid spring 120B disposed on the downstream side of the flow of the cathode gas CG, and a third grid spring 120C disposed between the first grid spring 120A and the second grid spring 120B.

As shown in FIGS. 18A-18C and 19A, the grid spring 120 has a flat substrate 125, and a plurality of elastically deformable raised pieces 130 (corresponding to spring members) that are raised so as to be cantilevered from the substrate 125.

The raised pieces 130 function as a spring that generates surface pressure between the substrate 125 and the power generation cell 101M as well as between the separator 102 and the metal support cell 101N by generating an elastic force in the stacking direction Z (refer to FIG. 15).

Figure 19A:
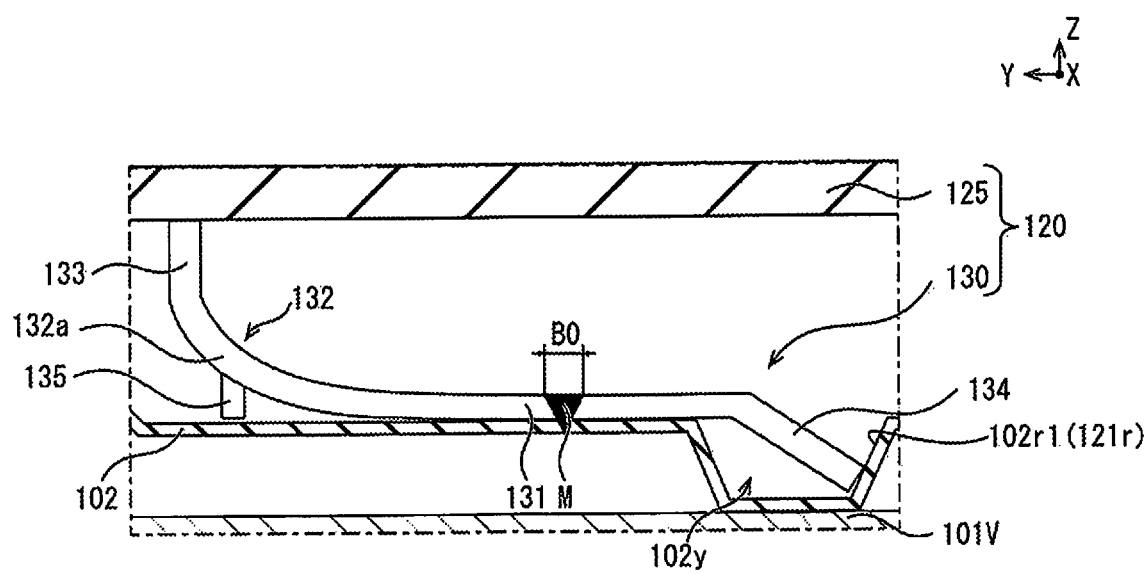
FIG. 19A is an enlarged view of the region surrounded by the broken line 19A in FIG. 15.
Figure 19B:
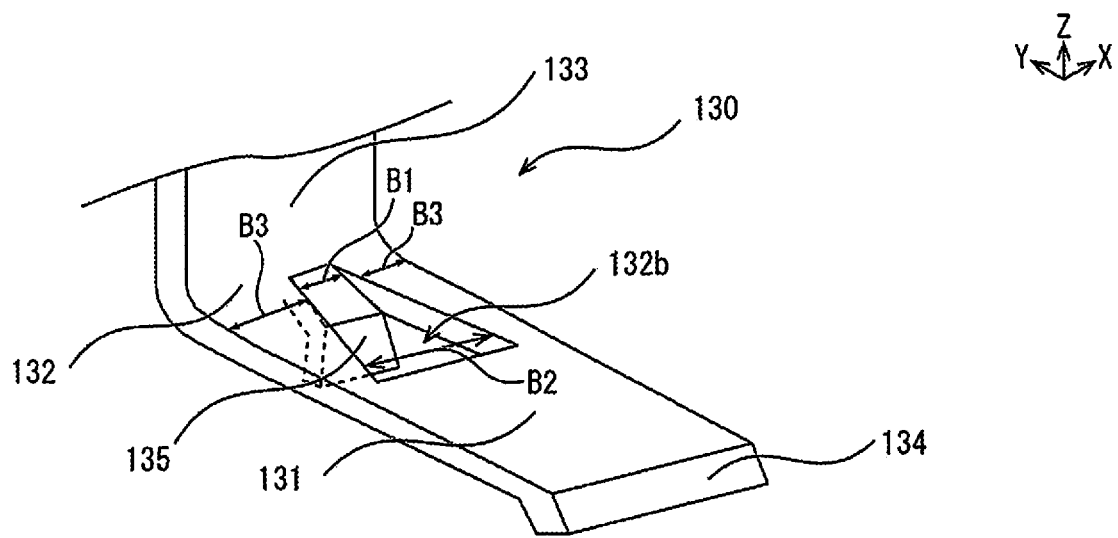
FIG. 19B is a perspective view illustrating raised pieces of the grid spring according to the embodiment.

As shown in FIG. 19A, the raised pieces 130 each have a planar portion 131 joined to the separator 102, a spring portion 132 extending from the planar portion 131, a pillar portion 133 extending from the spring portion 132 toward a direction away from the planar portion 131, an abutting portion 134 abutting a vertical wall 102r of a concave portion 102y (corresponding to a groove), and an auxiliary pillar portion 135 extending from the spring portion 132 toward the planar portion 131.

The planar portion 131 is joined to the separator 102 in a state of surface contact with the separator 102. The planar portion 131 and the separator 102 are welded and joined at a joint portion M. The length of the planar portion 131 is greater than the width required for welding and joining the planar portion 131 and the separator 102 (width B0 of the joint portion M).

The spring portion 132 receives force in the stacking direction Z to generate an elastic force for pressing the separator 102 toward the power generation cell 101M by bending and deforming.

The spring portion 132 has a curved portion 132a curved in a direction away from the planar portion 131, and the curvature of the curved portion 132a is determined in accordance with the required reaction force.

The pillar portion 133 extends along the stacking direction Z toward a direction away from the planar portion 131.

The abutting portion 134 extends from the planar portion 131 toward a direction different from the direction in which the spring portion 132 extends. The abutting portion 134 abuts the vertical wall 102r of the concave portion 102y in a state in which the planar portion 131 is in contact with the separator 102. The planar portion 131 is joined to the separator 102 in a state in which the abutting portion 134 abuts the vertical wall 102r of the concave portion 102y.

The distal end of the abutting portion 134 is bent toward the recessed direction of the concave portion 102y. The bending angle of the distal end of the abutting portion 134 is not particularly limited. The distance between the distal end of the abutting portion 134 and the planar portion 131 in the stacking direction Z is less than the depth of the concave portion 102y.

The auxiliary pillar portion 135 extends from the spring portion 132 in a direction toward the planar portion 131 along the stacking direction Z.

The width B1 of the auxiliary pillar portion 135 increases from the spring portion 132 toward the planar portion 131. The length of the auxiliary pillar portion 135 is adjusted such that a gap is formed with respect to the separator 102 to which the planar portion 131 is joined in a state in which no force acts on the grid spring 120 in the stacking direction Z.

The spring portion 132 has an opening 132b that is open in the stacking direction Z. The section modulus of the spring portion 132 increases with the distance from the planar portion 131 due to the opening 132b.

The opening 132b is disposed in the center of the spring portion 132 in the width direction. The opening 132b has a symmetrical shape with respect to a center line of the spring portion 132 in the width direction. In the spring portion 132, the opening 132b extends from the side connected to the planar portion 131 toward the side connected to the pillar portion 133. The width B2 of the opening 132b decreases in the direction from the planar portion 131 to the pillar portion 133.

In the spring portion 132, the width B3 of the portion excluding the opening 132b increases in the direction from the planar portion 131 to the pillar portion 133.

The auxiliary pillar portion 135 has a shape in which a part of the spring portion 132 is notched and bent. The opening 132b is formed together with the auxiliary pillar portion 135 by notching and bending a part of the spring portion 132.

Figure 20A:
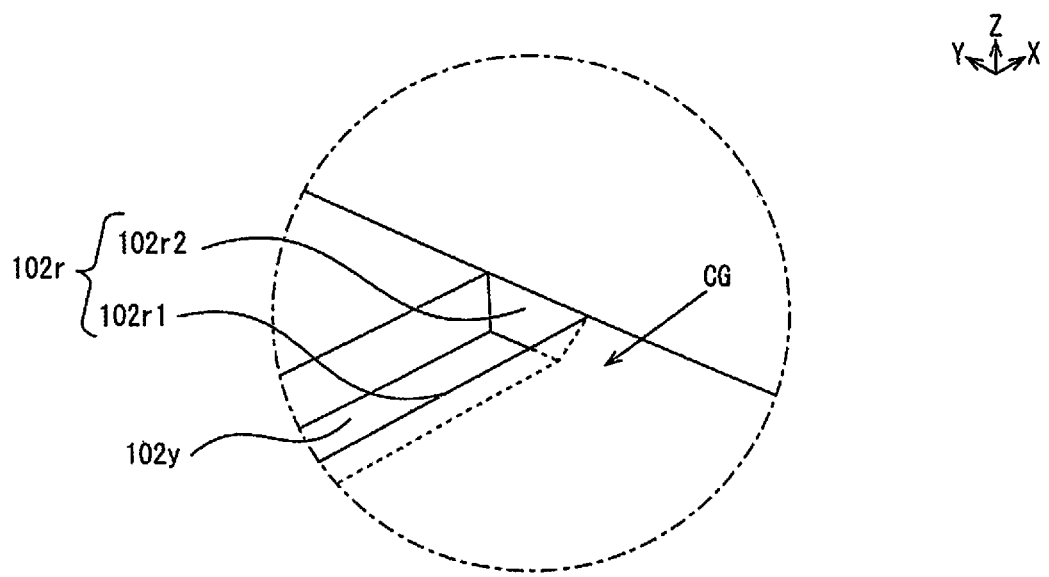
FIG. 20A is an enlarged perspective view of the region surrounded by the broken line 20A in FIG. 17B.
Figure 20B:
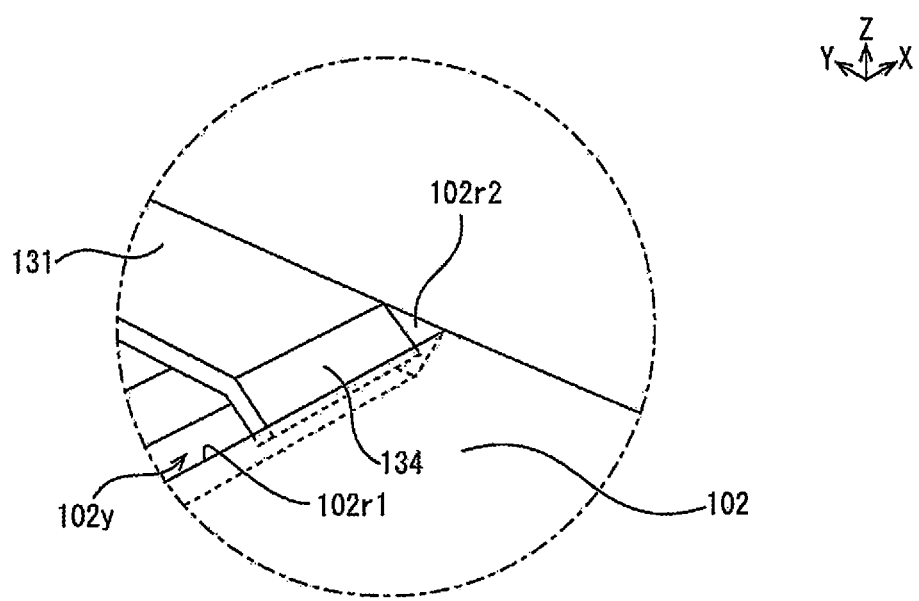
FIG. 20B is an enlarged perspective view of the region surrounded by the broken line 20A in FIG. 17B, illustrating a state in which an abutting portion abuts a concave portion.

As shown in FIGS. 20A and 20B, the concave portion 102y has a first vertical wall 102r1 that intersects the direction in which the abutting portion 134 extends (direction indicated by reference symbol Y in FIG. 20B) and a second vertical wall 102r2 that is along the direction in which the abutting portion 134 extends. As shown in FIG. 20B, the abutting portion 134 abuts the first vertical wall 102r1 while abutting the second vertical wall 102r2.

The spring constant of the raised pieces 130 of the first grid spring 120A (refer to FIG. 17A) is smaller than the spring constant of the raised pieces 130 of the second grid spring 120B and the spring constant of the raised pieces 130 of the third grid spring 120C.

The spring constant of the raised pieces 130 of the first grid spring 120A, the spring constant of the raised pieces 130 of the second grid spring 120B, and the spring constant of the raised pieces 130 of the third grid spring 120C can be adjusted, for example, by using methods such as varying the plate thickness of the raised pieces 130 or changing the material of the grid spring 120. In addition, the spring constants also can be adjusted by changing the curvature of the curved portion 132a of the spring portion 132.

The action and effects of the above-described embodiment will be described below.

The fuel cell stack 100S is made by stacking the plurality of cell units 100T, each having the power generation cell 101M that is formed by sandwiching the electrolyte 101S from both sides with the anode 101T and the cathode 101U and that generates power by using the supplied anode gas AG and cathode gas CG, and the separator 102 that defines the flow path portions 102L, which are flow passages of the anode 101T and the cathode 101U between the separator and the power generation cells 101M, and that is in conductive contact with the power generation cell 101M. The cell unit 100T has a grid spring 120 provided with raised pieces 130 that generate an elastic force for pressing the separator 102 toward the power generation cell 101M. Each raised piece 130 has a planar portion 131 that is joined to the separator 102 in a state of surface contact with the separator 102, and a spring portion 132 that extends from the planar portion 131 and that generates an elastic force for pressing the separator toward the power generation cell by receiving a force in the stacking direction Z of the cell unit and undergoing bending deformation.

According to the fuel cell stack 100S, the cell unit 100T and the grid spring 120, the raised pieces 130 are joined to the separator 102 in a state of surface contact with the separator 102 via the planar portion 131. As a result, compared to a case in which the raised pieces 130 contact the separator 102 at the ends, the contact area between the raised pieces 130 and the separator 102 increases. Therefore, compared to a case in which the raised pieces 130 contact the separator 102 at the ends, it is possible prevent stress from being concentrated at the contact points between the raised pieces 130 and the separator 102. As a result, creep deformation of the raised pieces 130 can be prevented, even when the temperature of the raised pieces 130 becomes high due to the emission of heat from the power generation cells 101M at the time of power generation. Thus, according to the fuel cell stack 100S, the cell unit 100T, and the grid spring 120, it is possible to prevent a decrease in the power generation performance caused by creep deformation of the raised pieces 130.

In particular, since the fuel cell stack 100S according to the present embodiment is a solid oxide fuel cell (SOFC), which uses a solid oxide ceramic as the electrolyte 101S, the operating temperature is extremely high, approximately 700 to 1000° C. Therefore, compared to a solid polymer membrane fuel cell, the raised pieces 130 are relatively easily subjected to creep deformation at the time of operation. With the configuration described above, the fuel cell stack 100S can restrict the creep deformation of the raised pieces 130 and maintain power generation performance even for long periods of operation in a high-temperature state.

In addition by using the fuel cell stack 100S, the cell unit 100T and the grid spring 120, since the raised pieces 130 are joined to the separator 102 via the planar portion 131, unlike the case in which the ends of the raised pieces 130 are not joined to the separator 102, it is possible to prevent the occurrence of slippage between the raised pieces 130 and the separator 102. As a result, since the attitude of the substrate 125 is stabilized, the distance between the separator 102 and the power generation cell 101M with which the substrate 125 is in conductive contact can be maintained at the appropriate distance. Therefore, the pressure loss of the cathode gas CG that flows between the power generation cell 101M and the separator 102 is reduced, and the power generation performance of the fuel cell 100 is improved. This effect is remarkable when the fuel cell 100 is configured as a solid oxide fuel cell that has a high operating temperature, which easily causes creep deformation of the raised pieces 130.

In addition, by using the fuel cell stack 100S, the cell unit 100T and the grid spring 120, the curved portion 132a of the spring portion 132 is curved in the stacking direction Z.

By using the fuel cell stack 100S, the cell unit 100T and the grid spring 120, the spring portion 132 can be configured by using a simple configuration in which the curved portion 132a is curved. Therefore, by using the fuel cell stack 100S, the manufacture the fuel cell 100 can be facilitated.

Figure 17B:
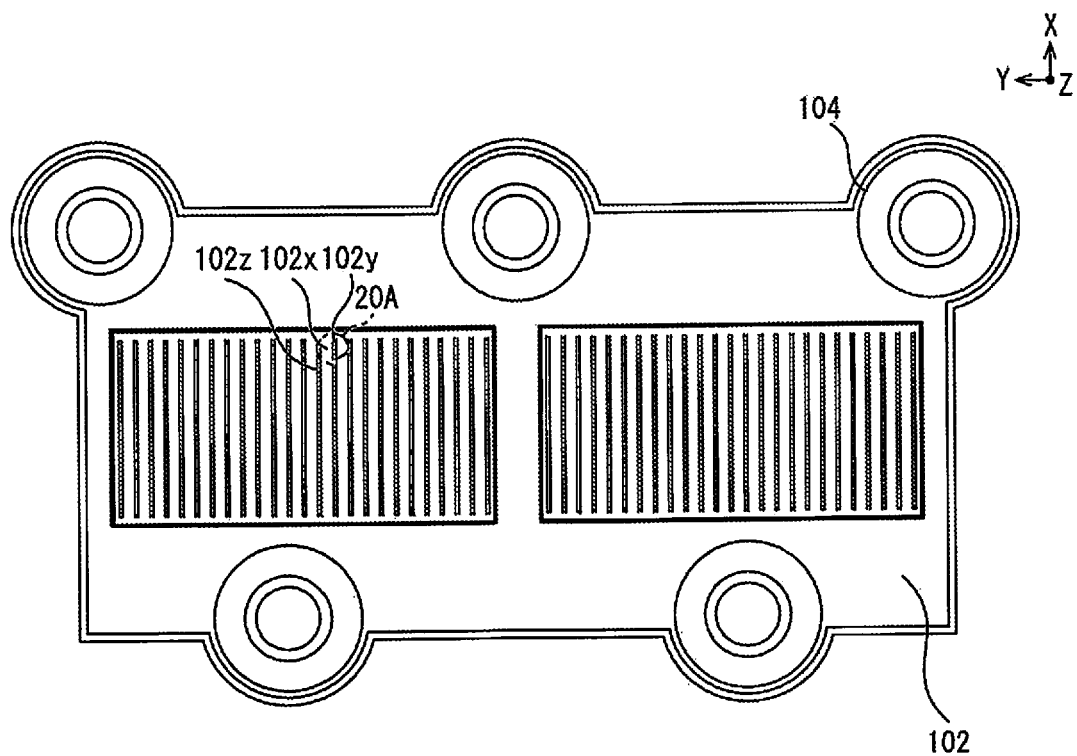
FIG. 17B is a plan view illustrating the cell unit according to the embodiment, with a grid spring and the auxiliary collector layer omitted.
Figure 18A:
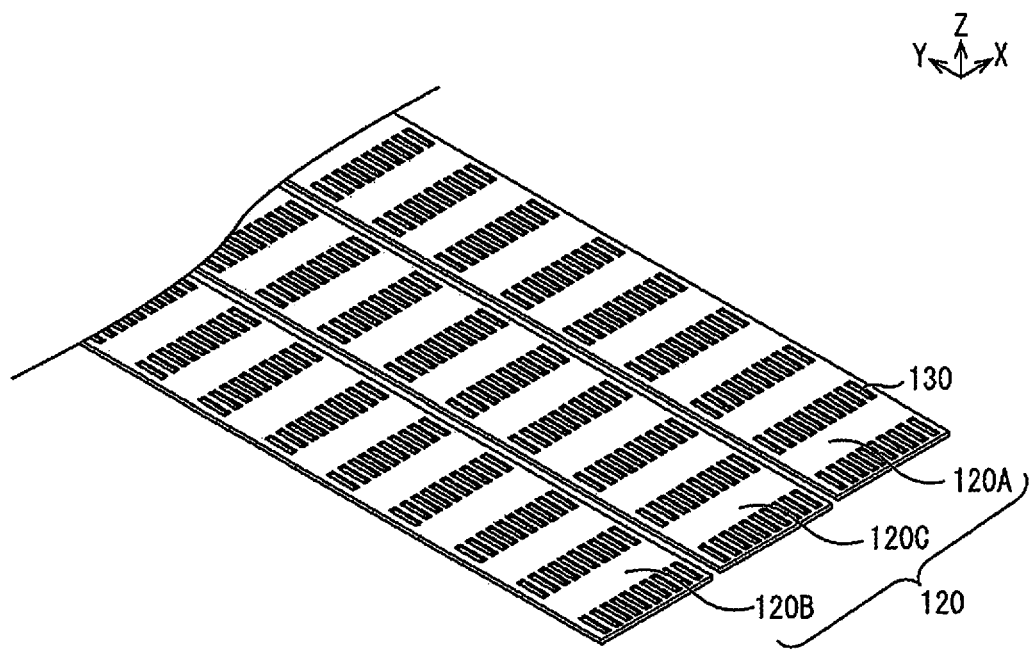
FIG. 18A is a perspective view of the grid spring according to the embodiment.
Figure 18B:
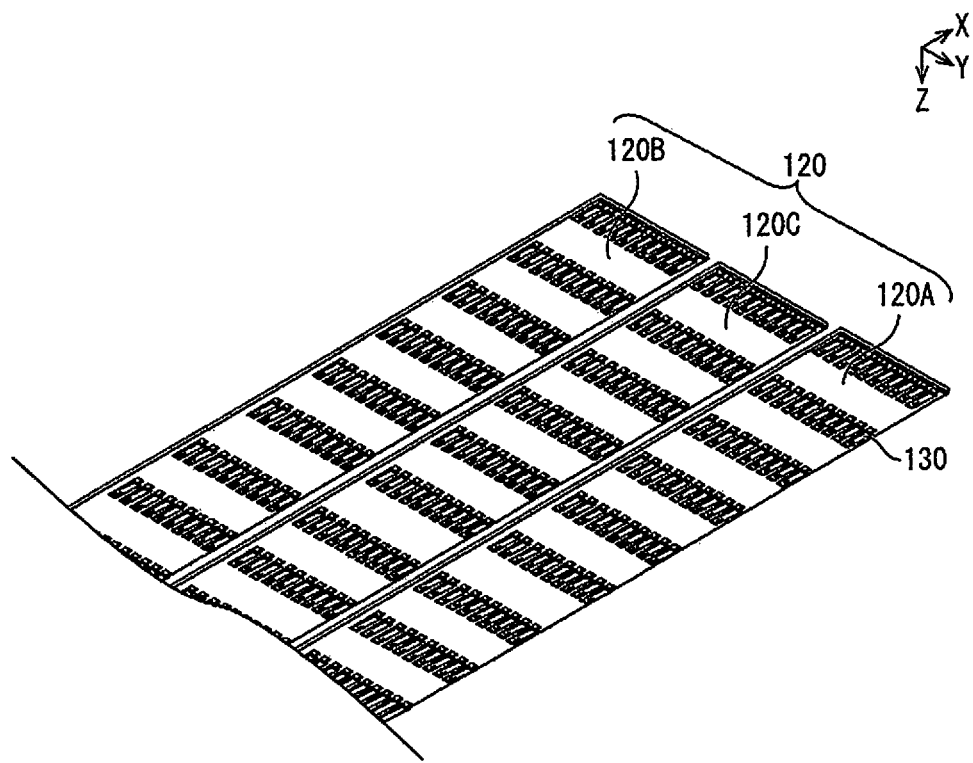
FIG. 18B is a perspective view of the grid spring according to the embodiment.
Figure 18C:
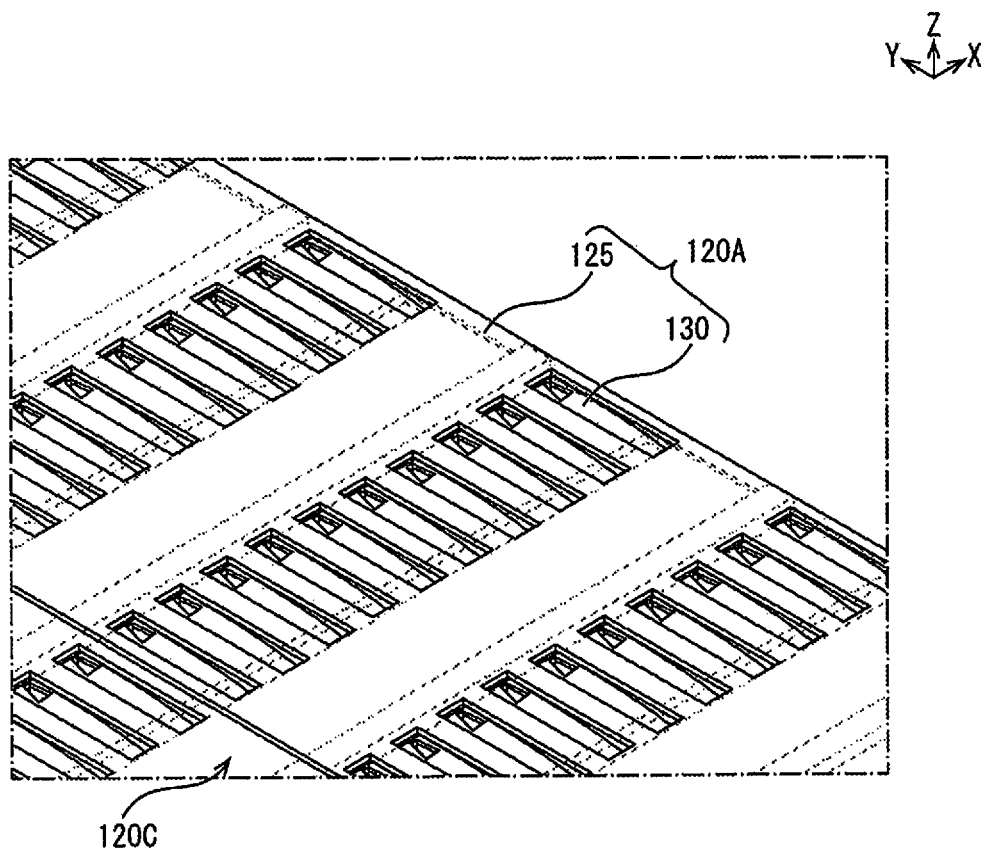
FIG. 18C is a perspective view partially (region 18C in FIG. 17A) illustrating the separator of FIG. 17A.

In addition, according to the fuel cell stack 100S, the cell unit 100T, and the grid spring 120, the curved portion 132a is curved in such a way that it is possible to absorb the displacement of the substrate 125 in the planar direction of the separator 102 (direction indicated by the reference symbol Y in FIG. 17). As a result, since the attitude of the substrate 125 is stabilized, the distance between the separator 102 and the power generation cell 101M with which the substrate 125 is in conductive contact can be reliably maintained at the appropriate distance. Therefore, the pressure loss of the cathode gas CG that flows between the power generation cell 101M and the separator 102 is more reliably reduced, so that the power generation performance of the fuel cell 100 is further improved.

In addition, in the fuel cell stack 100S, the cell unit 100T, and the grid spring 120, each of the raised pieces 130 further has the pillar portion 133 that extends from the spring portion 132 along a direction intersecting the planar portion 131 toward a direction away from the planar portion 131.

By using the fuel cell stack 100S, the cell unit 100T and the grid spring 120, the pillar portions 133 can efficiently support the stacking direction Z force that acts on the raised pieces 130 from the power generation cells 101M. It is thereby possible to more reliably restrict the displacement of the power generation cell 101M in the stacking direction Z. Therefore, the distance between the separator 102 and the power generation cell 101M with which the substrate 125 is in conductive contact can be more reliably maintained at the appropriate distance. Therefore, the pressure loss of the cathode gas CG that flows between the power generation cell 101M and the separator 102 is more reliably reduced, so that the power generation performance of the fuel cell 100 is further improved.

In addition, according to the fuel cell stack 100S, the cell unit 100T, and the grid spring 120, the pillar portions 133 extend in the stacking direction Z.

By using the fuel cell stack 100S, the cell unit 100T and the grid spring 120, the pillar portions 133 can more efficiently support the force from the power generation cells 101M in the stacking direction Z that acts on the raised pieces 130. It is thereby possible to more reliably restrict the displacement of the power generation cell 101M in the stacking direction Z.

In addition, in the fuel cell stack 100S, the cell unit 100T, and the grid spring 120, each of the raised pieces 130 further has the auxiliary pillar portion 135 that extends from the spring portion 132 along the stacking direction Z toward the planar portion 131.

By using the fuel cell stack 100S, the cell unit 100T and the grid spring 120, when the stacking direction Z force acts on the raised pieces 130, part of the stacking direction Z force can be received by the auxiliary pillar portions 135. It is thereby possible to prevent the raised pieces 130 from excessively deforming in the stacking direction Z, even if the raised pieces 130 undergo creep deformation. Therefore, by using the fuel cell stack 100S, it is possible to more reliably prevent a decrease in the power generation performance caused by creep deformation of the raised pieces 130.

In addition, by using the fuel cell stack 100S, the cell unit 100T, and the grid spring 120, the auxiliary pillar portion 135 has a shape in which a part of the spring portion 132 is notched and bent.

By using the fuel cell stack 100S, the cell unit 100T and the grid spring 120, the auxiliary pillar portion 135 can be formed by notching a part of the spring portion 132. Therefore, according to the fuel cell stack 100S, manufacture of the fuel cell 100 can be facilitated.

In addition, according to the fuel cell stack 100S, the cell unit 100T, and the grid spring 120, the spring portion 132 has the opening 132*b* that opens in the direction of intersection. The section modulus of the spring portion 132 increases with the distance from the planar portion 131 due to the opening 132*b*.

By using the fuel cell stack 100S, the cell unit 100T and the grid spring 120, the bending rigidity of the spring portion 132 increases with the distance from the planar portion 131. The bending stress, which is caused by the bending deformation that starts at the portion connected to the planar portion 131, acts more evenly in the spring portion 132. Therefore, since the stress that acts on the spring portion 132 is dispersed, it is possible to more reliably prevent creep deformation of the spring portion 132. As a result, by using the fuel cell stack 100S, it is possible to more reliably prevent a decrease in the power generation performance caused by creep deformation of the raised pieces 130.

In addition, by using the fuel cell stack 100S, the cell unit 100T and the grid spring 120, the separator 102 has concave portions 102*y* that are recessed from the surface to which the raised pieces 130 are joined. The raised piece 130 further has the abutting portion 134 that extends from the planar portion 131 in a direction different from the direction in which the spring portion 132 extends, and that abuts the vertical wall 102*r* of the concave portion 102*y* in a state in which the planar portion 131 is joined to the separator 102.

By using the fuel cell stack 100S, the cell unit 100T and the grid spring 120, the abutting portion 134 abuts the vertical wall 102*r* of the concave portion 102*y*, so that the raised pieces 130 can be easily positioned in the planar direction of the separator 102. Therefore, according to the fuel cell stack 100S, the cell unit 100T, and the grid spring 120, manufacture of the fuel cell 100 can be facilitated.

In addition, in the fuel cell stack 100S, the cell unit 100T, and the grid spring 120, the distal end of the abutting portion 134 is bent toward the direction of the recess of the concave portion 102*y*.

By using the fuel cell stack 100S, the cell unit 100T and the grid spring 120, the abutting portion 134 can more reliably abut the vertical wall 102*r* of the concave portion 102*y*. It is thereby possible to more reliably position the raised pieces 130 in the planar direction of the separator 102. Therefore, according to the fuel cell stack 100S, manufacture of the fuel cell 100 can be facilitated. In addition, the convex portion 102*z* improves the rigidity of the separator 102 and increases the cross-sectional area of the anode-side flow path.

In addition, in the fuel cell stack 100S, the cell unit 100T, and the grid spring 120, the distance between the planar portion 131 and the distal end of the abutting portion 134 in the intersecting direction is less than the depth of the concave portion 102*y*.

By using the fuel cell stack 100S, the cell unit 100T and the grid spring 120, the abutting portion 134 can more reliably abut the vertical wall 102*r* of the concave portion 102*y*. It is thereby possible to more reliably position the raised pieces 130 in the planar direction of the separator 102. Therefore, by using the fuel cell stack 100S, the manufacture of the fuel cell 100 can be facilitated.

In addition, in the fuel cell stack 100S, the cell unit 100T, and the grid spring 120, the cathode gas CG is supplied from one end side of the separator 102 configuring the outer perimeter and flows along the planar direction of the separator 102 toward the other end side opposing the one end, between the power generation cell 101M and the separator 102. The concave portion 102*y* has the first vertical wall 102*r*1 along the direction of the flow of the cathode gas CG and the second vertical wall 102*r*2 that intersects the direction of the flow of the gas. The abutting portion 134 abuts the first vertical wall 102*r*1 while abutting the second vertical wall 102*r*2.

By using the fuel cell stack 100S, the cell unit 100T and the grid spring 120, the abutting portion 134 abuts the first vertical wall 102*r*1 and the abutting portion 134 abuts the second vertical wall 102*r*2, so that it is thereby possible to restrict the positions of the raised pieces 130 in the direction of the flow of the cathode gas CG and the direction intersecting the flow direction. It is thereby possible to reliably position the raised pieces 130 in the direction of the flow of the cathode gas CG and the direction intersecting the flow direction. Therefore, according to the fuel cell stack 100S, the manufacture of the fuel cell 100 can be facilitated.

In addition, in the fuel cell stack 100S, the cell unit 100T, and the grid spring 120, the length of the planar portion 131 is greater than the width required for welding and joining the planar portion 131 and the separator 102.

By using the fuel cell stack 100S, the cell unit 100T and the grid spring 120, welding and joining the planar portion 131 and the separator 102 can be facilitated. It is thereby possible to more reliably ensure the conductivity between the planar portion 131 and the separator 102.

In addition, the fuel cell stack 100S, the cell unit 100T, and the grid spring 120 have a plurality of the raised pieces 130. The plurality of the raised pieces 130 are arranged along the planar direction of the separator 102.

By using the fuel cell stack 100S, the cell unit 100T and the grid spring 120, it is possible to uniformly press the separator 102 toward the power generation cell 101M in the planar direction by using the plurality of raised pieces 130. Therefore, a more uniform surface pressure can be more reliably applied between the power generation cell 101M and the separator 102. Therefore, the power generation performance of the fuel cell 100 is further improved.

In addition, the fuel cell stack 100S, the cell unit 100T, and the grid spring 120 have a plurality of the raised pieces 130 in which the flat portions 131 are joined to the separator 102. The cathode gas CG is supplied from one end side of the separator 102 configuring the outer perimeter and flows along the planar direction of the separator 102 toward the other end side opposing the one end between the power generation cell 101M and the separator 102. The spring constant of one raised piece 130 of the plurality of raised pieces 130 is smaller than the spring constant of another raised pieces 130 disposed on the downstream side of the direction of the flow of the cathode gas CG.

Since the temperature of the raised pieces 130 decreases from the upstream side to the downstream side of the cathode gas CG, the thermal expansion of the raised pieces 130 is greater on the upstream side. Therefore, the thermal stress acting on the raised pieces 130 on the upstream side is greater than that acting on the raised pieces 130 on the downstream side. By using the configuration described above, it is possible to better equalize the stress that acts on the raised pieces 130, even if the thermal stress acting on the raised pieces 130 on the upstream side is greater than that acting on the raised pieces 130 on the downstream side. Therefore, it is possible to more reliably prevent creep deformation of the raised pieces 130.

First Modified Example

Figure 21:
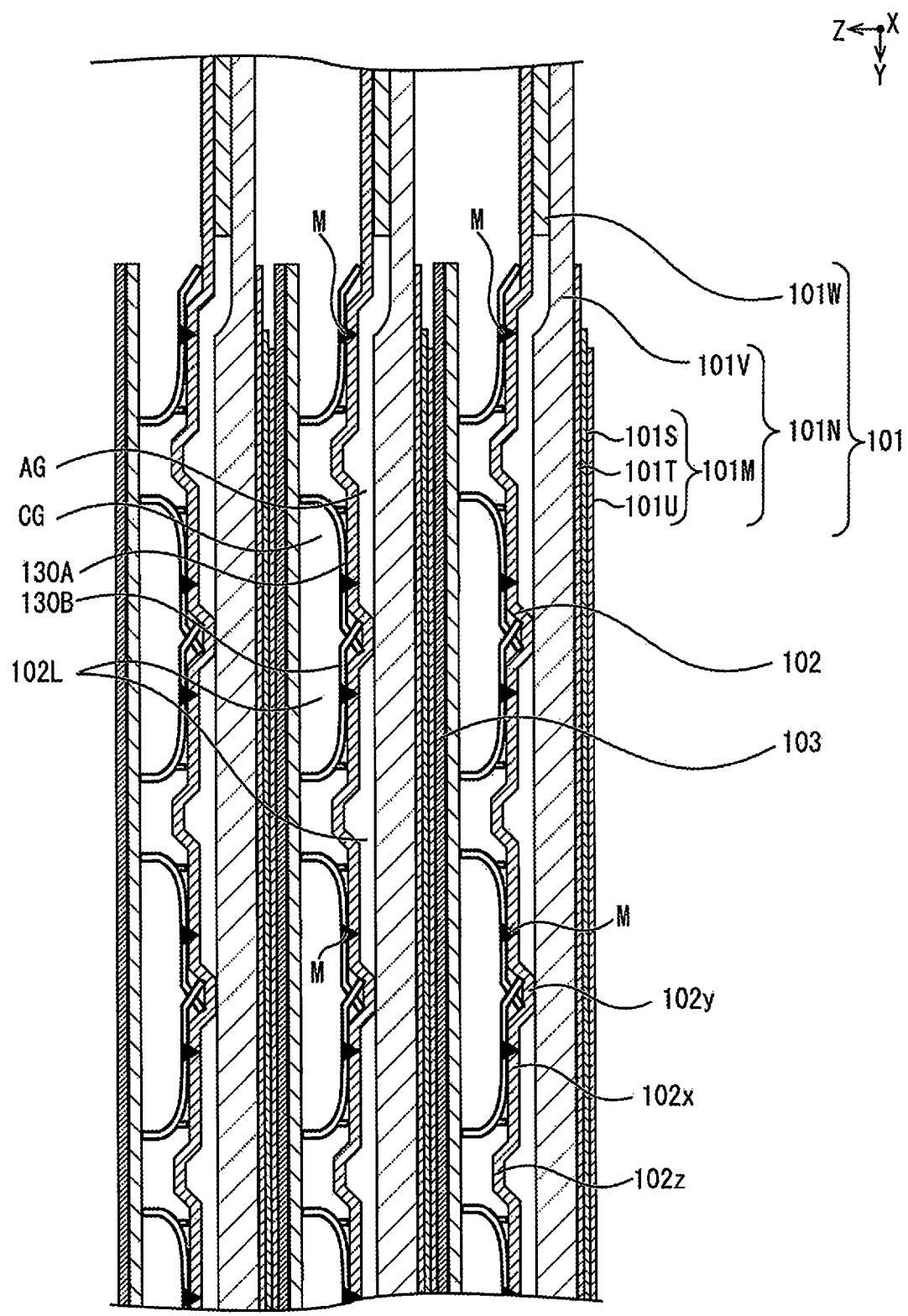
FIG. 21 is a cross-sectional view of the fuel cell according to the first embodiment, corresponding to FIG. 15.

In the embodiment described above, the raised pieces 130 are oriented in the same direction in the planar direction of the separator 102. However, as shown in FIG. 21, the grid spring 120 may have first raised pieces 130A and second raised pieces 130B, which are oriented in a different direction from the first raised pieces 130A, to thereby obtain a more uniform pressing force.

Naturally, the fuel cell stack, the cell unit, and the grid spring according to the present modified example exert the same effects as the embodiment described above.

Second Modified Example

Figure 22A:
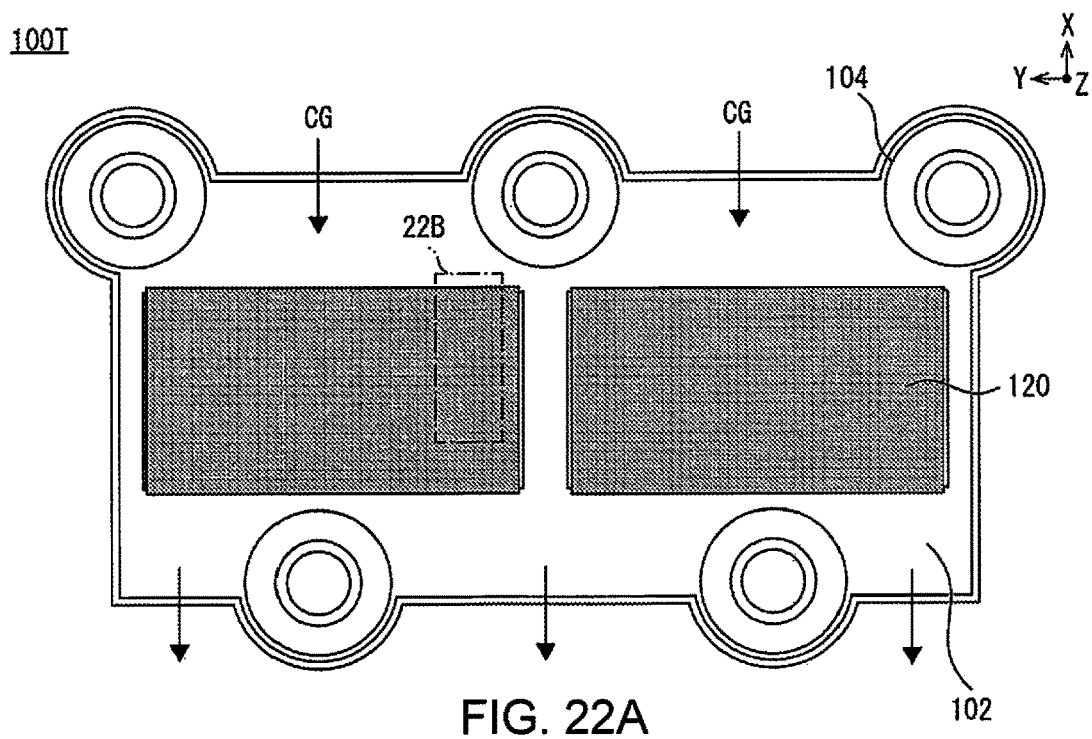
FIG. 22A is a plan view illustrating the cell unit according to a second embodiment, with the auxiliary collector layer omitted.

In the embodiment and the modified example described above, the grid spring 120 is divided into the first grid spring 121, the second grid spring 122, and the third grid spring 123. However, as shown in FIG. 22A, instead of being divided, the grid spring 120 may be in the form of a single spring.

The fuel cell stack, the cell unit, and the grid spring according to the present modified example not only exert the same effects as the embodiment described above, but also can facilitate installation when the grid spring is loaded to improve ease of assembly.

Even if the grid spring 120 is not divided, the spring constant of the raised pieces 130 is adjusted such that the spring constant of one raised piece 130 of the plurality of raised pieces 130 is smaller than the spring constant of another raised piece 130 disposed on the downstream side in the direction of the flow of the cathode gas CG.

Figure 22B:
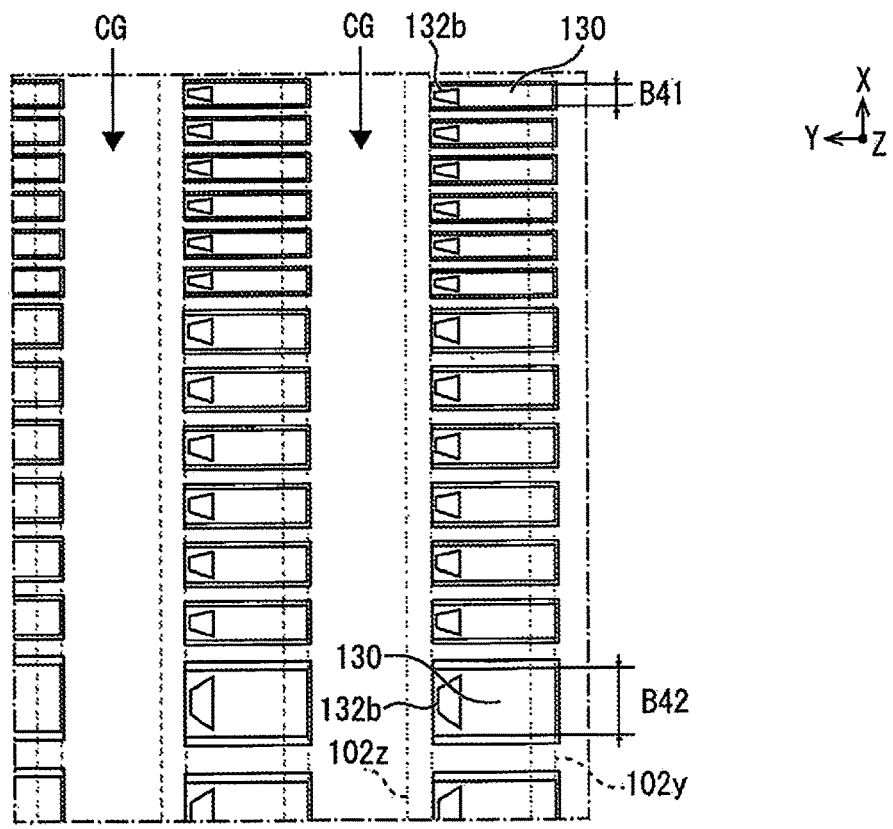
FIG. 22B is an enlarged view of the region surrounded by the broken line 22B in FIG. 22A.

Specifically, the spring constant of the grid spring 120 can be adjusted by adjusting the shapes of the plurality of raised pieces 130. For example, as shown in FIG. 22B, the spring constant of the raised pieces 130 can be adjusted by making the width B41 of one raised piece 130 of the plurality of raised pieces 130 smaller than the width B42 of another raised piece 130 disposed on the downstream side of the direction of the flow of the cathode gas CG. The spring constant of the raised pieces 130 can be adjusted not only by adjusting the width of the raised pieces 130, but also by adjusting the degree of curvature of the curved portion 132*a* (refer to FIG. 19A), the size of the opening 132*b*, or the like.

According to the present embodiment, it is thereby possible to arbitrarily and finely adjust the spring constant for each location.

Third Modified Example

The shape of the cell unit 100T is not limited to the shapes described in the embodiment and modified examples described above. For example, the shape of the cell unit 100T may be formed as shown in FIGS. 23A and 23B.

Figure 23A:
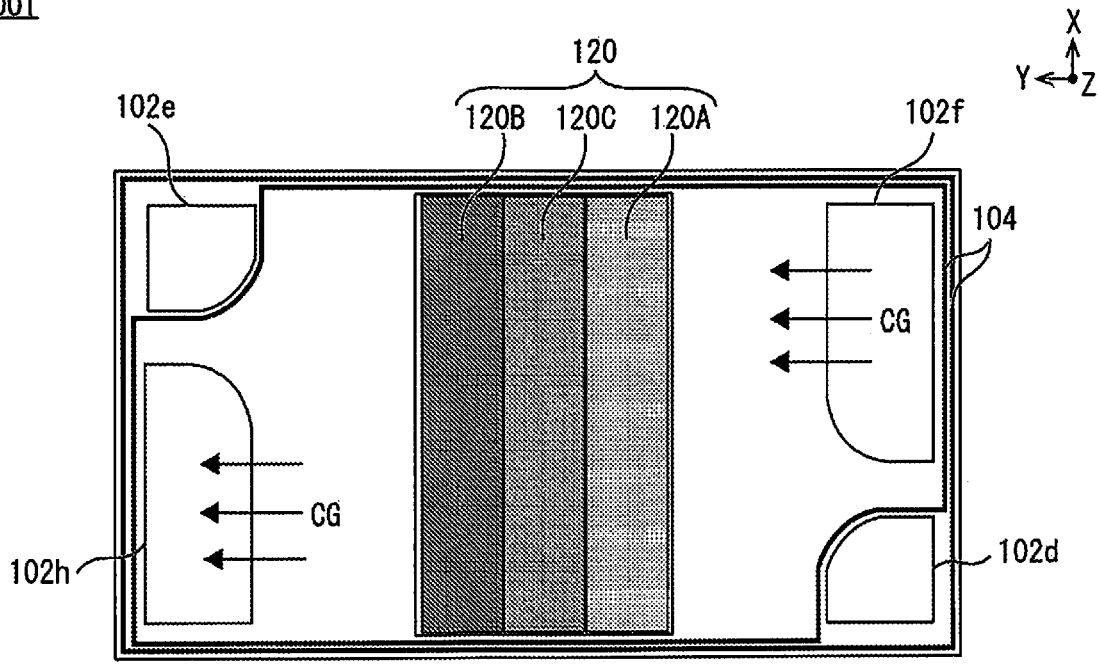
FIG. 23A is a plan view illustrating the cell unit according to a third embodiment, with the auxiliary collector layer omitted.
Figure 23B:
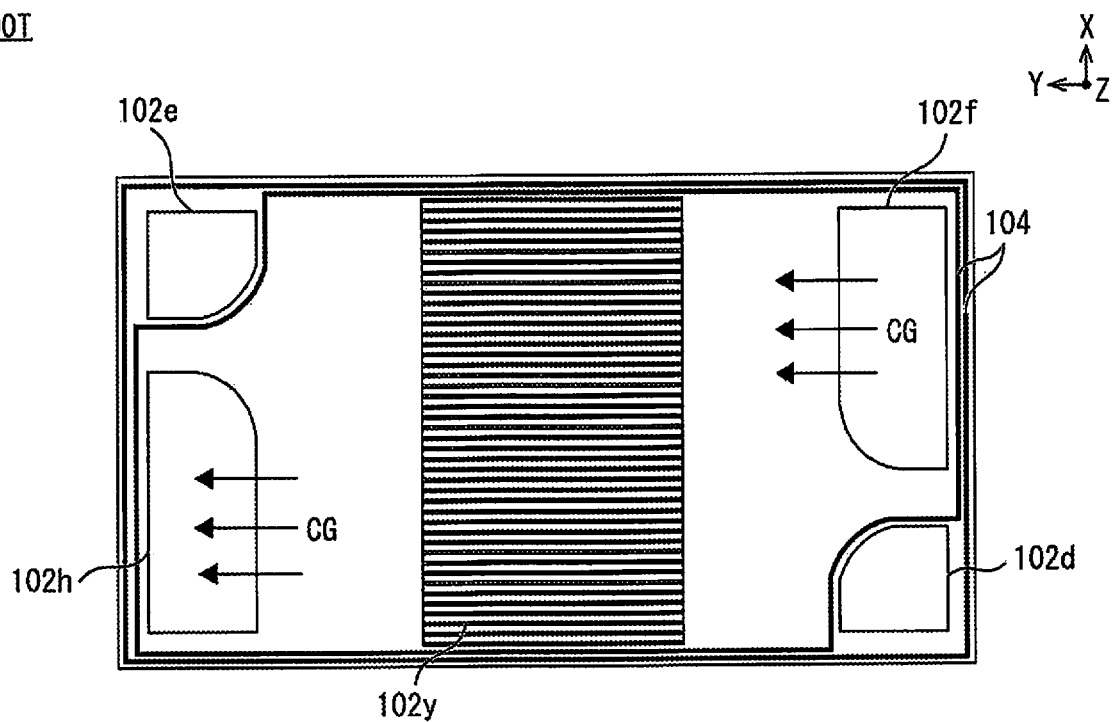
FIG. 23B is a plan view illustrating the cell unit according to the third embodiment, with the grid spring and the auxiliary collector layer omitted.

In the examples shown in FIGS. 23A and 23B, the form of the contour of the cell unit 100T is essentially rectangular. The cathode-side inlet 102*f* and the cathode-side outlet 102*h* are disposed on a diagonal line of the cell unit 100T. The cathode gas CG flows from the cathode-side inlet 102*f* toward the cathode-side outlet 102*h*.

The fuel cell stack, the cell unit, and the grid spring according to the present modified example not only also exert the same effects as the embodiments described above, but also can make the flow more uniform.

It is also possible to remove the auxiliary collector layer 103 of the flat portion of the substrate 125 of the grid spring 120 to further reduce the weight.

Besides the foregoing, various modifications to the present invention based on the configurations described in the Claims are possible, which also belong to the scope of the present invention.

The invention claimed is:

1. A spring member used for a fuel cell stack in which are stacked a plurality of fuel cell units, each of the fuel cell units having a power generation cell that is formed by sandwiching an electrolyte from both sides with a pair of electrodes and that generates power by using supplied gas, and a separator that defines a flow path portion, which is a flow passage for the gas between the separator and the power generation cell, and that is in conductive contact with the power generation cell, the spring member comprising:
   a planar portion joined to the separator in a state of surface contact with the separator;
   a spring portion extending from the planar portion to generate an elastic force that presses the separator toward the power generation cell by receiving a force in a stacking direction of the cell and undergoing bending deformation;
   a pillar portion extending from the spring portion in a direction away from the planar portion along a direction intersecting the planar portion; and
   an auxiliary pillar portion extending from the spring portion in a direction toward the planar portion along the stacking direction.

2. The spring member according to claim 1, wherein the spring portion has a curved portion curved in the stacking direction.

3. The spring member according to claim 1, wherein the pillar portion extends along the stacking direction.

4. The spring member according claim 1, wherein the auxiliary pillar portion has a shape in which a part of the spring portion is notched and bent.

5. The spring member according to claim 1, wherein the spring portion has an opening that opens in the stacking direction, and a section modulus of the spring portion increases due to the opening as a distance from the planar portion increases.

6. The spring member according to claim 1, wherein a length of the planar portion is greater than a width required to weld and join the planar portion and the separator.

7. A fuel cell unit comprising:
   a power generation cell formed by sandwiching an electrolyte from both sides with a pair of electrodes and that generates power by using supplied gas;
   a separator that defines a flow path portion, which is a flow passage for the gas between the separator and the power generation cell, and that is in conductive contact with the power generation cell; and
   a spring member including a planar portion joined to the separator in a state of surface contact with the separator, and a spring portion extending from the planar portion to generates an elastic force for pressing the separator toward the power generation cell by receiving a force in the stacking direction Z of the cell unit and undergoing bending deformation, the separator having a groove recessed from a surface to which the spring member is joined, the spring member further having an abutting portion that extends from the planar portion in a direction different from a direction in which the spring portion extends, and that abuts a vertical wall of the groove in a state in which the planar portion is in contact with the separator, a distal end of the abutting portion is bent toward a recessed direction of the groove, and the distance between the planar portion and the distal end of the abutting portion in the stacking direction being less than a depth of the groove.

8. The fuel cell unit according to claim 7, wherein the groove has a first vertical wall intersecting the direction in which the abutting portion extends, and a second vertical wall along the direction in which the abutting portion extends, and the abutting portion abuts the first vertical wall while abutting the second vertical wall.

9. The fuel cell unit according to claim 7, comprising a plurality of the spring members arranged along a planar direction of the separator.

10. A fuel cell stack comprising a plurality of the fuel cell units according to claim 7, wherein the fuel cell units are arranged in a stack.

11. The fuel cell stack according to claim 10, further comprising a plurality of the spring members arranged along a planar direction of the separator, wherein the gas is supplied from one end of an outer perimeter of the separator and flows between the power generation cell and the separator in the planar direction of the separator toward opposite end side from the one end, and a spring constant of one of the spring members from among the plurality of the spring members is smaller than a spring constant of another one of the plurality of the spring members that is disposed on a downstream side in a direction of gas flow.

* * * * *